(12) United States Patent
Zhang et al.

(10) Patent No.: US 10,547,487 B1
(45) Date of Patent: *Jan. 28, 2020

(54) INTEGER NON-UNIFORM CONSTELLATION FOR HIGH-ORDER QAM

(71) Applicant: Marvell International Ltd., Hamilton (BM)

(72) Inventors: Yan Zhang, Palo Alto, CA (US); Hongyuan Zhang, Fremont, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 40 days.

This patent is subject to a terminal disclaimer.

(21) Appl. No.: 15/627,163

(22) Filed: Jun. 19, 2017

Related U.S. Application Data

(63) Continuation-in-part of application No. 15/486,154, filed on Apr. 12, 2017, now Pat. No. 9,967,127.

(60) Provisional application No. 62/352,707, filed on Jun. 21, 2016, provisional application No. 62/321,721, filed on Apr. 12, 2016.

(51) Int. Cl.
*H04L 27/34* (2006.01)
*H04L 27/38* (2006.01)
*H04L 27/36* (2006.01)

(52) U.S. Cl.
CPC .......... *H04L 27/3411* (2013.01); *H04L 27/36* (2013.01); *H04L 27/38* (2013.01)

(58) Field of Classification Search
CPC ... H04L 27/36411; H04L 27/36; H04L 27/38; H04L 27/34; H04L 27/3405; H04L 27/3411; H04L 27/362
See application file for complete search history.

(56) References Cited

U.S. PATENT DOCUMENTS

| 9,106,470 | B2 | 8/2015 | Zhao et al. |
| 9,967,127 | B1* | 5/2018 | Sun ........................ H04L 27/362 |
| 2006/0085727 | A1 | 4/2006 | Azenkot et al. |
| 2009/0092208 | A1* | 4/2009 | Montekyo ............... H04L 1/005 375/346 |
| 2015/0349997 | A1* | 12/2015 | Baek ................... H04L 27/2637 375/262 |
| 2016/0344497 | A1 | 11/2016 | Myung |
| 2016/0366005 | A1* | 12/2016 | Liu ..................... H03M 13/1102 |
| 2017/0230226 | A1 | 8/2017 | Stadelmeier |

(Continued)

OTHER PUBLICATIONS

Thomas Handte, "Non-Uniform Constellations for 1024-QAM", Doc. IEEE 802.11-15/1289r1, Nov. 8, 2015, 22 pages.

(Continued)

*Primary Examiner* — David B Lugo

(57) ABSTRACT

The present disclosure includes systems and techniques relating to an integer non-uniform constellation (NUC) high-order M-QAM. In some implementations, M is no less than 1024. Each of M constellation points of the integer NUC M-QAM has respective integer real and imaginary coordinates. A bit pattern is received and mapped to integer real and imaginary coordinates of one of the M constellation points according to a mapping rule of the integer NUC M-QAM. A transmission signal is modulated in accordance with the integer real and imaginary coordinates of the one of the M constellation points of the integer NUC M-QAM.

17 Claims, 18 Drawing Sheets

(56) References Cited

U.S. PATENT DOCUMENTS

2018/0006777 A1   1/2018   Ko

OTHER PUBLICATIONS

Souto et al., "Non-Uniform Constellations for Broadcasting and Multicasting Services in WCDMA Systems", 14th 1ST Mobile & Wireless Communications Summit, Jun. 19-23, 2005.

* cited by examiner

Example 0d (900)

| Amplitude level | |
|---|---|
| $u_0$ | 1 |
| $u_1$ | 3 |
| $u_2$ | 5 |
| $u_3$ | 7 |
| $u_4$ | 9 |
| $u_5$ | 11 |
| $u_6$ | 13 |
| $u_7$ | 16 |
| $u_8$ | 18 |
| $u_9$ | 21 |
| $u_{10}$ | 23 |
| $u_{11}$ | 26 |
| $u_{12}$ | 28 |
| $u_{13}$ | 32 |
| $u_{14}$ | 36 |
| $u_{15}$ | 40 |

Example 0e (950)

| Amplitude level | |
|---|---|
| $u_0$ | 1 |
| $u_1$ | 3 |
| $u_2$ | 5 |
| $u_3$ | 7 |
| $u_4$ | 9 |
| $u_5$ | 11 |
| $u_6$ | 13 |
| $u_7$ | 15 |
| $u_8$ | 17 |
| $u_9$ | 20 |
| $u_{10}$ | 23 |
| $u_{11}$ | 26 |
| $u_{12}$ | 29 |
| $u_{13}$ | 32 |
| $u_{14}$ | 36 |
| $u_{15}$ | 40 |

Example 1a — 1000

| Amplitude level | |
|---|---|
| $u_0$ | 1 |
| $u_1$ | 3 |
| $u_2$ | 5 |
| $u_3$ | 7 |
| $u_4$ | 9 |
| $u_5$ | 11.5 |
| $u_6$ | 13.5 |
| $u_7$ | 15.5 |
| $u_8$ | 18 |
| $u_9$ | 20.5 |
| $u_{10}$ | 23.5 |
| $u_{11}$ | 26 |
| $u_{12}$ | 29 |
| $u_{13}$ | 32.5 |
| $u_{14}$ | 36 |
| $u_{15}$ | 40 |

Example 1b — 1050

| Amplitude level | |
|---|---|
| $u_0$ | 1 |
| $u_1$ | 3 |
| $u_2$ | 5 |
| $u_3$ | 7 |
| $u_4$ | 9 |
| $u_5$ | 11 |
| $u_6$ | 13 |
| $u_7$ | 15.5 |
| $u_8$ | 18 |
| $u_9$ | 20.5 |
| $u_{10}$ | 23 |
| $u_{11}$ | 26 |
| $u_{12}$ | 29 |
| $u_{13}$ | 32.5 |
| $u_{14}$ | 36 |
| $u_{15}$ | 40 |

FIG. 10

Example 2a — 1100

| Amplitude level | |
|---|---|
| $u_0$ | 1 |
| $u_1$ | 3 |
| $u_2$ | 5 |
| $u_3$ | 7 |
| $u_4$ | 9.25 |
| $u_5$ | 11.25 |
| $u_6$ | 13.5 |
| $u_7$ | 15.75 |
| $u_8$ | 18.25 |
| $u_9$ | 20.75 |
| $u_{10}$ | 23.25 |
| $u_{11}$ | 26 |
| $u_{12}$ | 29.25 |
| $u_{13}$ | 32.5 |
| $u_{14}$ | 36 |
| $u_{15}$ | 40.25 |

Example 2b — 1150

| Amplitude level | |
|---|---|
| $u_0$ | 1 |
| $u_1$ | 3 |
| $u_2$ | 5 |
| $u_3$ | 7 |
| $u_4$ | 9.25 |
| $u_5$ | 11.5 |
| $u_6$ | 13.75 |
| $u_7$ | 16 |
| $u_8$ | 18.5 |
| $u_9$ | 21 |
| $u_{10}$ | 23.5 |
| $u_{11}$ | 26.25 |
| $u_{12}$ | 29.25 |
| $u_{13}$ | 32.5 |
| $u_{14}$ | 36 |
| $u_{15}$ | 40.25 |

FIG. 11

Example 3a

1200

| | Amplitude level |
|---|---|
| $u_0$ | 1 |
| $u_1$ | 3 |
| $u_2$ | 5 |
| $u_3$ | 7 |
| $u_4$ | 9.125 |
| $u_5$ | 11.25 |
| $u_6$ | 13.5 |
| $u_7$ | 15.75 |
| $u_8$ | 18.125 |
| $u_9$ | 20.625 |
| $u_{10}$ | 23.25 |
| $u_{11}$ | 26.125 |
| $u_{12}$ | 29.125 |
| $u_{13}$ | 32.375 |
| $u_{14}$ | 36 |
| $u_{15}$ | 40.125 |

Example 3b

1250

| | Amplitude level |
|---|---|
| $u_0$ | 1 |
| $u_1$ | 3 |
| $u_2$ | 5 |
| $u_3$ | 7 |
| $u_4$ | 9.125 |
| $u_5$ | 11.25 |
| $u_6$ | 13.5 |
| $u_7$ | 15.75 |
| $u_8$ | 18.125 |
| $u_9$ | 20.625 |
| $u_{10}$ | 23.25 |
| $u_{11}$ | 26 |
| $u_{12}$ | 29 |
| $u_{13}$ | 32.25 |
| $u_{14}$ | 36.75 |
| $u_{15}$ | 40.5 |

FIG. 12

| Example 4a | |
|---|---|
| Amplitude level | |
| $u_0$ | 1 |
| $u_1$ | 3 |
| $u_2$ | 5 |
| $u_3$ | 7.0625 |
| $u_4$ | 9.125 |
| $u_5$ | 11.25 |
| $u_6$ | 13.4375 |
| $u_7$ | 15.75 |
| $u_8$ | 18.125 |
| $u_9$ | 20.625 |
| $u_{10}$ | 23.3125 |
| $u_{11}$ | 26.125 |
| $u_{12}$ | 29.125 |
| $u_{13}$ | 32.4375 |
| $u_{14}$ | 36 |
| $u_{15}$ | 40.1875 |

| Example 4b | |
|---|---|
| Amplitude level | |
| $u_0$ | 1 |
| $u_1$ | 3 |
| $u_2$ | 5 |
| $u_3$ | 7.0625 |
| $u_4$ | 9.125 |
| $u_5$ | 11.25 |
| $u_6$ | 13.4375 |
| $u_7$ | 15.6875 |
| $u_8$ | 18.0625 |
| $u_9$ | 20.5625 |
| $u_{10}$ | 23.1875 |
| $u_{11}$ | 26 |
| $u_{12}$ | 29.0625 |
| $u_{13}$ | 32.4375 |
| $u_{14}$ | 36.1875 |
| $u_{15}$ | 40.375 |

Figure 16:
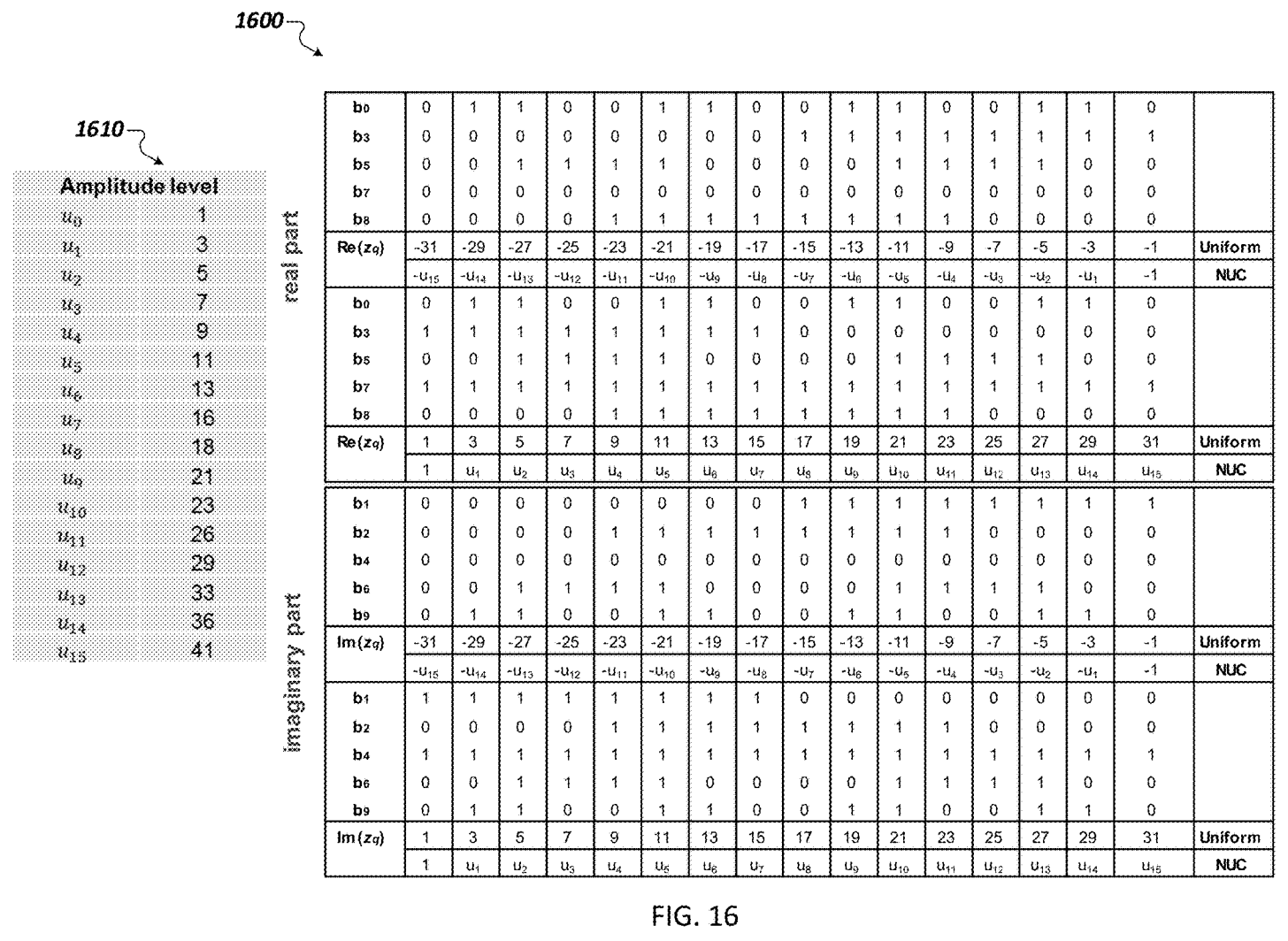

| | | | | | | | | | | | | | | | | | | |
|---|---|---|---|---|---|---|---|---|---|---|---|---|---|---|---|---|---|---|
| $b_0$ | 0 | 1 | 1 | 0 | 0 | 1 | 0 | 0 | 1 | 1 | 0 | 0 | 1 | 0 | | | | Uniform |
| $b_3$ | 1 | 1 | 1 | 1 | 0 | 1 | 0 | 0 | 0 | 0 | 1 | 0 | 1 | 0 | | | | NUC |
| $b_5$ | 0 | 0 | 1 | 0 | 0 | 1 | 0 | 1 | 0 | 1 | 0 | 0 | 1 | 0 | | | | |
| $b_7$ | 0 | 0 | 0 | 0 | 0 | 0 | 0 | 0 | 0 | 0 | 0 | 0 | 0 | 0 | | | | |
| $b_8$ | 0 | 0 | 0 | 0 | 0 | 1 | 1 | 1 | 1 | 1 | 1 | 1 | 1 | 1 | | | | |
| $Re(z_q)$ | -31 | -29 | -27 | -25 | -23 | -21 | -19 | -17 | -15 | -13 | -11 | -9 | -7 | -5 | -3 | -1 | | real part |

(Figure 16 is a complex table showing bit-to-symbol mapping for Uniform and NUC constellations, with real and imaginary parts, amplitude levels 1610 referenced as 1, 3, 5, 7, 9, 11, 13, 16, 18, 21, 23, 26, 29, 33, 36, 41 for $u_0$ through $u_{15}$.)

*real part*

| | b15 | b14 | b13 | b12 | b11 | b10 | b9 | b8 | b7 | b6 | b5 | b4 | b3 | b2 | b1 | b0 | |
|---|---|---|---|---|---|---|---|---|---|---|---|---|---|---|---|---|---|
| b3 | 0 | 1 | 0 | 1 | 0 | 1 | 0 | 0 | 1 | 0 | 1 | 0 | 1 | 0 | 1 | 0 | |
| b4 | 0 | 0 | 1 | 0 | 1 | 1 | 1 | 1 | 0 | 0 | 0 | 0 | 1 | 1 | 1 | 1 | |
| b5 | 0 | 1 | 0 | 1 | 1 | 1 | 0 | 0 | 0 | 0 | 1 | 1 | 1 | 1 | 0 | 0 | |
| b8 | 0 | 0 | 0 | 0 | 0 | 0 | 0 | 0 | 1 | 1 | 1 | 1 | 1 | 1 | 1 | 1 | |
| b9 | 0 | 0 | 0 | 0 | 0 | 0 | 0 | 0 | 1 | 1 | 1 | 1 | 1 | 1 | 1 | 1 | |
| Re($z_q$) | -31 | -29 | -27 | -25 | -23 | -21 | -19 | -17 | -15 | -13 | -11 | -9 | -7 | -5 | -3 | -1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | | NUC |
| b3 | 0 | 1 | 1 | 0 | 0 | 1 | 1 | 0 | 0 | 1 | 1 | 0 | 0 | 1 | 1 | 0 | |
| b4 | 0 | 0 | 1 | 1 | 1 | 1 | 0 | 0 | 0 | 0 | 1 | 1 | 1 | 1 | 0 | 0 | |
| b5 | 0 | 0 | 0 | 0 | 1 | 1 | 1 | 1 | 1 | 1 | 1 | 1 | 0 | 0 | 0 | 0 | |
| b8 | 1 | 1 | 1 | 1 | 1 | 1 | 1 | 1 | 0 | 0 | 0 | 0 | 0 | 0 | 0 | 0 | |
| b9 | 0 | 0 | 0 | 0 | 0 | 0 | 0 | 0 | 1 | 1 | 1 | 1 | 1 | 1 | 1 | 1 | |
| Re($z_q$) | 1 | 3 | 5 | 7 | 9 | 11 | 13 | 15 | 17 | 19 | 21 | 23 | 25 | 27 | 29 | 31 | |
| | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | | |

*imaginary part*

| | | | | | | | | | | | | | | | | | |
|---|---|---|---|---|---|---|---|---|---|---|---|---|---|---|---|---|---|
| b0 | 0 | 1 | 0 | 1 | 0 | 1 | 0 | 0 | 1 | 0 | 1 | 0 | 1 | 0 | 1 | 0 | |
| b1 | 0 | 0 | 1 | 0 | 1 | 1 | 1 | 1 | 0 | 0 | 0 | 0 | 1 | 1 | 1 | 1 | |
| b2 | 0 | 1 | 0 | 1 | 1 | 1 | 0 | 0 | 0 | 0 | 1 | 1 | 1 | 1 | 0 | 0 | |
| b6 | 0 | 0 | 0 | 0 | 0 | 0 | 0 | 0 | 1 | 1 | 1 | 1 | 1 | 1 | 1 | 1 | |
| b7 | 0 | 0 | 0 | 0 | 0 | 0 | 0 | 0 | 1 | 1 | 1 | 1 | 1 | 1 | 1 | 1 | |
| Im($z_q$) | -31 | -29 | -27 | -25 | -23 | -21 | -19 | -17 | -15 | -13 | -11 | -9 | -7 | -5 | -3 | -1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | | NUC |
| b0 | 0 | 1 | 1 | 0 | 0 | 1 | 1 | 0 | 0 | 1 | 1 | 0 | 0 | 1 | 1 | 0 | |
| b1 | 0 | 0 | 1 | 1 | 1 | 1 | 0 | 0 | 0 | 0 | 1 | 1 | 1 | 1 | 0 | 0 | |
| b2 | 0 | 0 | 0 | 0 | 1 | 1 | 1 | 1 | 1 | 1 | 1 | 1 | 0 | 0 | 0 | 0 | |
| b6 | 1 | 1 | 1 | 1 | 1 | 1 | 1 | 1 | 0 | 0 | 0 | 0 | 0 | 0 | 0 | 0 | |
| b7 | 0 | 0 | 0 | 0 | 0 | 0 | 0 | 0 | 1 | 1 | 1 | 1 | 1 | 1 | 1 | 1 | |
| Im($z_q$) | 1 | 3 | 5 | 7 | 9 | 11 | 13 | 15 | 17 | 19 | 21 | 23 | 25 | 27 | 29 | 31 | |
| | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | | |

1710

| | Amplitude level |
|---|---|
| $u_0$ | 1 |
| $u_1$ | 2.9667 |
| $u_2$ | 4.9871 |
| $u_3$ | 7.0015 |
| $u_4$ | 9.0819 |
| $u_5$ | 11.1960 |
| $u_6$ | 13.3951 |
| $u_7$ | 15.6735 |
| $u_8$ | 18.0691 |
| $u_9$ | 20.5980 |
| $u_{10}$ | 23.2914 |
| $u_{11}$ | 26.1728 |
| $u_{12}$ | 29.2806 |
| $u_{13}$ | 32.6657 |
| $u_{14}$ | 36.4161 |
| $u_{15}$ | 40.7366 |

1810

| Amplitude level | |
|---|---|
| $u_0$ | 1 |
| $u_1$ | 2.9902 |
| $u_2$ | 5.0100 |
| $u_3$ | 7.0446 |
| $u_4$ | 9.1283 |
| $u_5$ | 11.2570 |
| $u_6$ | 13.4588 |
| $u_7$ | 15.7417 |
| $u_8$ | 18.1292 |
| $u_9$ | 20.6379 |
| $u_{10}$ | 23.2916 |
| $u_{11}$ | 26.1151 |
| $u_{12}$ | 29.1412 |
| $u_{13}$ | 32.4176 |
| $u_{14}$ | 36.0267 |
| $u_{15}$ | 40.1583 |

INTEGER NON-UNIFORM CONSTELLATION FOR HIGH-ORDER QAM

CROSS REFERENCE TO RELATED APPLICATIONS

This application is a continuation-in-part of, and claims priority to, U.S. patent application Ser. No. 15/486,154, filed Apr. 12, 2017, and entitled "Integer Non-Uniform Constellation For High-Order QAM," which claims the benefit of the priority of U.S. Provisional Application Ser. No. 62/321,721, filed on Apr. 12, 2016, and entitled "Integer Non-Uniform Constellation for 1024QAM," and this application claims the benefit of the priority of U.S. Provisional Application Ser. No. 62/352,707, filed on Jun. 21, 2016, and entitled "Non-Uniform Constellation with Integer Values for 1024 QAM," all of which are hereby incorporated by reference, in their entirety.

BACKGROUND

The present disclosure describes systems and techniques relating to an integer non-uniform constellation (NUC) for high-order quadrature amplitude modulation (QAM), such as 1024-QAM for use in communication systems.

Quadrature amplitude modulation (QAM) is a modulation scheme that maps bits into constellation points (also referred to as grid points or QAM symbols), according to a mapping rule. Each constellation point (e.g., carrying phase and magnitude information) corresponds to a binary bit pattern (e.g., corresponding to an array of bits). For example, an M-QAM mapping rule can be used to map M number of constellation points to M number of bit patterns, wherein each bit pattern includes $L=\log_2(M)$ number of bits. Common forms of QAM include 16-QAM, 64-QAM, and 256-QAM.

In some implementations, the M number of constellation points can be represented in a constellation diagram that includes a real axis and an imaginary axis. Each constellation point can thus be represented by its respective real coordinate (also referred to as an in-phase (I) component) and imaginary coordinate (also referred to as a quadrature (Q) component). For example, an M-QAM symbol, X, can be represented by its coordinates (Re(X), Im(X)), which is mapped to a particular bit pattern L represented by the series of bits $(C_0\text{-}C_{L-1})$, according to a specified M-QAM mapping rule.

SUMMARY

The present disclosure includes systems and techniques relating to an integer non-uniform constellation (NUC) high-order QAM, such as 1024-QAM. According to an aspect of the described systems and techniques, a method includes identifying, by a data processing apparatus, a scale factor for a mapping of bit patterns into M constellation points of a non-uniform constellation (NUC) M-quadrature amplitude modulation (QAM), wherein M is no less than 1024; each of the M constellation points of the NUC M-QAM has respective real and imaginary coordinates; and the respective real and imaginary coordinates having respective decimal parts that are integer multiples of $2^{-n}$, with n being a non-negative integer less than 5; receiving, by the data processing apparatus, a bit pattern; mapping, by the data processing apparatus, the bit pattern to integer real and imaginary coordinates of one of the M constellation points of the NUC M-QAM according to a mapping rule of the NUC M-QAM, wherein the integer real and imaginary coordinates of the one of the M constellation points of the NUC M-QAM equal the scale factor multiplied with respective real and imaginary coordinates of the one of the M constellation points of the NUC M-QAM having respective decimal parts; and causing, by the data processing apparatus, a transmission signal to be modulated in accordance with the integer real and imaginary coordinates of the one of the M constellation points of the NUC M-QAM.

Implementations of this aspect can include one or more of the following features. In some implementations, the method further includes informing a receiver of the scale factor or a value of n.

According to another aspect of the described systems and techniques, a device includes a receiver; and a processor, when executing computer-readable instructions, causing the device to perform operations including: identifying a scale factor for a mapping of M constellation points of a non-uniform constellation (NUC) M-quadrature amplitude modulation (QAM) into bit patterns, wherein: M is no less than 1024; each of the M constellation points of the NUC M-QAM has respective real and imaginary coordinates; and the respective real and imaginary coordinates having respective decimal parts that are integer multiples of $2^{-n}$, with n being a non-negative integer less than 5; receiving a data symbol carrying information of a constellation point of the NUC M-QAM; determining the data symbol to be one of M constellation points of the NUC M-QAM based on respective real and imaginary coordinates of the data symbol and integer real and imaginary coordinates of the one of the M constellation points of the NUC M-QAM, wherein the integer real and imaginary coordinates of the M constellation points of the NUC M-QAM equal the scale factor multiplied with the respective real and imaginary coordinates of the one of the M constellation points of the NUC M-QAM having respective decimal parts; and mapping the one of M constellation points into a bit pattern according to a mapping rule of the NUC M-QAM.

Implementations of this aspect can include one or more of the following features. In some implementations, the data symbol is obtained from a received signal that is transmitted over a communication channel. In some implementations, determining the data symbol to be one of the M constellation points of the NUC M-QAM includes determining a distance between the data symbol and the one of the M constellation points of the NUC M-QAM.

According to another aspect of the described systems and techniques, a system includes a transmitter coupled with a processor, the processor, when executing computer-readable instructions, causing the transmitter to identify a scale factor for a mapping of bit patterns into M constellation points of a non-uniform constellation (NUC) M-quadrature amplitude modulation (QAM), wherein M is no less than 1024; each of the M constellation points of the NUC M-QAM has respective real and imaginary coordinates; and the respective real and imaginary coordinates having respective decimal parts that are integer multiples of $2^{-n}$, with n being a non-negative integer less than 5; receive a bit pattern; map the bit pattern to integer real and imaginary coordinates of one of the M constellation points of the NUC M-QAM according to a mapping rule of the NUC M-QAM, wherein the integer real and imaginary coordinates of the one of the M constellation points of the NUC M-QAM equal the scale factor multiplied with respective real and imaginary coordinates of the one of the M constellation points of the NUC M-QAM having respective decimal parts; and modulate a transmission signal in accordance with the integer real and imaginary coordinates of the one of the M constellation points of the NUC M-QAM.

Implementations of this aspect can include one or more of the following features. In some implementations, the system further includes a receiver coupled with a second processor, the second processor, when executing computer-readable instructions, causing the receiver to identify the scale factor for the mapping of bit patterns into M constellation points of the NUC M-QAM; receive a data symbol carrying information of a constellation point of the NUC M-QAM; determine the data symbol to be one of M constellation points of the NUC M-QAM based on respective real and imaginary coordinates of the data symbol and integer real and imaginary coordinates of the one of the M constellation points of the NUC M-QAM, wherein the integer real and imaginary coordinates of the M constellation points of the NUC M-QAM equal the scale factor multiplied with the respective real and imaginary coordinates of the one of the M constellation points of the NUC M-QAM having respective decimal parts; and map the one of M constellation points into a bit pattern according to a mapping rule of the NUC M-QAM.

In some implementations, the processor causes the transmitter to transmit the scale factor or a value of n to the receiver. In some implementations, the second processor causes the receiver to receive the scale factor or a value of n.

Implementations of any of these aspects can include one or more of the following features. In some implementations, the scale factor is $2^n$. In some implementations, M equals 1024. In some implementations, n is 0, the scale factor is 1, and the respective real and imaginary coordinates of each of the M constellation points of the NUC M-QAM have respective integer parts that are from a first set of [1, 3, 5, 7, 9, 11, 13, 16, 18, 21, 23, 26, 29, 32, 36, and 40], a second set of [1, 3, 5, 7, 9, 12, 14, 17, 19, 22, 24, 27, 30, 34, 37, and 40], a third set of [1, 3, 5, 7, 9, 12, 15, 18, 21, 24, 27, 30, 33, 36, 39 and 42], a fourth set of [1, 3, 5, 7, 9, 11, 13, 16, 18, 21, 23, 26, 28, 32, 36, and 40], or a fifth set of [1, 3, 5, 7, 9, 11, 13, 15, 17, 20, 23, 26, 29, 32, 36, and 40].

In some implementations, the respective real and imaginary coordinates of each of the M constellation points of the NUC M-QAM have respective integer parts that are determined based on integer parts of respective real and imaginary coordinates of a non-integer NUC M-QAM.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, or a medium access unit), a mobile data processing apparatus (e.g., a wireless client, a cellular telephone, a personal digital assistant (PDA), a mobile computer, or a digital camera), a general purpose data processing apparatus (e.g., a minicomputer, a server, a mainframe, or a supercomputer), or combinations of these.

The disclosed technologies can result in one or more of the following potential advantages. The described systems and techniques can provide more reliable data communications with high data rates in communication systems. The described systems and techniques can improve computational efficiency while achieving the same or similar error performance, compared to existing technologies. The described systems and techniques allow more efficient design and implementations of a transmitter (TX) and receiver (RX). For example, the described systems and techniques can be implemented with minor, if any, hardware changes, and with low computational complexity.

Details of one or more implementations are set forth in the accompanying drawings and the descriptions below. Other features and advantages may be apparent from the description and drawings, and from the claims.

DRAWING DESCRIPTIONS

FIG. 5 is a diagram showing an example of a mapping rule of a non-integer NUC 1024 QAM, according to an implementation.

FIG. 6 is a diagram showing a mapping rule of an integer NUC 1024 QAM when n equals 0, according to an implementation.

FIG. 8 is a diagram showing a mapping rule of an integer NUC 1024 QAM when n equals 0, according to another implementation.

FIG. 9 is a diagram showing two amplitude mapping tables for an integer NUC 1024 QAM when n equals 0, according to two implementations.

FIG. 10 is a diagram showing two amplitude mapping tables for an integer NUC 1024 QAM when n equals 1, according to two implementations.

FIG. 11 is a diagram showing two amplitude mapping tables for an integer NUC 1024 QAM when n equals 2, according to two implementations.

FIG. 12 is a diagram showing two amplitude mapping tables for an integer NUC 1024 QAM when n equals 3, according to two implementations.

FIG. 13 is a diagram showing two amplitude mapping tables for an integer NUC 1024 QAM when n equals 4, according to two implementations.

FIG. 16 is a diagram showing a mapping rule of an integer NUC 1024 QAM for MCS 11, according to an implementation.

FIG. 17 is a diagram showing a mapping rule of a non-integer NUC 1024 QAM for MCS 10, according to another implementation.

FIG. 18 is a diagram showing a mapping rule of a non-integer NUC 1024 QAM for MCS 11, according to another implementation.

DETAILED DESCRIPTION

Figure 1:
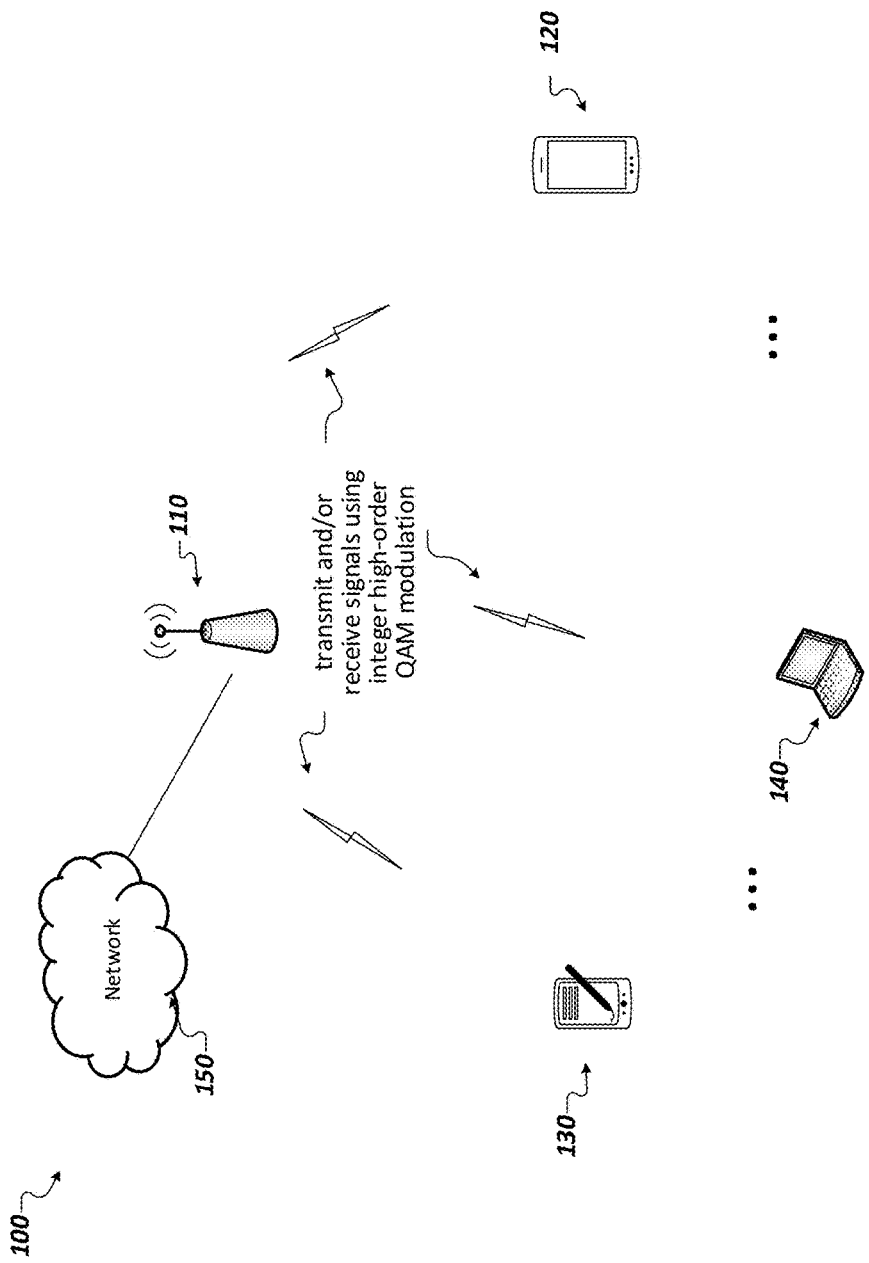
FIG. 1 is a block diagram showing an example of a communication system.

The systems and techniques described herein can be implemented using one or more devices, such as one or more integrated circuit (IC) devices, in a communication device (e.g., a wireless communication device, a wireline communication device, an electronic data storage device, or a channel medium access access/control device). For example, the systems and techniques disclosed can be implemented in a wireless local area network (WLAN) transceiver device (e.g., a WLAN chipset).

With the increasing data traffic demands, wireless communication systems have been developing to support multi-user-multiple-input-and-multiple-output (MU-MIMO) operations (e.g., 4-stream MIMO), wider bandwidth (e.g., 160 MHz bandwidth (BW) in the Institute of Electrical and Electronics Engineers (IEEE) 802.11 ac standard), and higher-order modulation schemes (e.g., 1024 quadrature amplitude modulation (QAM)).

1024-QAM has been introduced in IEEE 802.1 lax to further improve peak data rate. As an example, by using 1024-QAM with rate 5/6, the peak data rate is boosted by 25% from using only 256-QAM. However, to achieve a reliable performance, existing 1024-QAM modulation schemes require high signal to noise ratio (SNR) or sensitivity at receivers (RXs), and also put a stringent error vector magnitude (EVM) requirement (for example, 35 dBc) on transmitters (TXs) or RXs.

It has been found that a non-uniform constellation (NUC) can be applied to 1024-QAM to lower the sensitivity or EVM requirements, compared to a uniform constellation (UC) case. A NUC can be a one-dimension NUC (1D NUC) or a two-dimension NUC (2D NUC). One example of a NUC is a constellation with unequally-spaced constellation points to provide unequal bit error protection to different bits of a constellation point. In other words, when each constellation point is encoded with two or more bits, this non-uniform constellation QAM can provide different error protection to the two or more bits of the constellation point. The different error protection can be achieved, for example, by placing some constellation points relatively close to each other while others are more spaced out in a constellation diagram.

In this disclosure, for M-QAM, M represents the total number of constellation points of the M-QAM in a constellation diagram, and L represents the number of bits that map to each constellation point where $L=\log_2(M)$. For example, a specific mapping rule of M-QAM can be used to map M number of constellation points to M number of bit patterns, wherein each bit pattern includes an array of number of L bits. As an example, when M=1024, a 1024-QAM constellation has 1024 constellation points. Each constellation point maps to a 10-bit bit pattern, an array of bits $b_0 b_1 \ldots b_9$ (as $L=\log_2(1024)=10$).

A high-order QAM modulation refers to an M-QAM modulation that has M>=1024 constellation points. For example, this disclosure often uses 1024-QAM as an example of high-order QAM modulation. However, the systems and techniques described herein can be applied to other high-order QAM modulations, such as 2048-QAM and beyond.

In some implementations, for NUC QAM (e.g., NUC 1024-QAM), it is desirable that inner constellation points are denser and outer constellation points are sparser. However, constellation points of a known NUC 1024-QAM require floating point precision, which puts additional burden on hardware implementation of the TXs and RXs. The current implementation of UC 1024-QAM is of integer precision, and thus only 10 bits are used for such representations in some implementations. Floating point precision may not be implemented on existing hardware that is designed for UC 1024-QAM.

The proposed integer NUC high-order QAM helps simplify the hardware implementation of the TXs and RXs while maintaining or substantially maintaining performance improvement of NUC high-order QAM relative to uniform constellation high-order QAM. The proposed integer NUC high-order QAM refers to a NUC high-order QAM whose each constellation point is of a precision of a finite integer number of bits. For example, the proposed integer NUC high-order QAM allows real and imaginary coordinates, especially their respective decimal parts, of each constellation point being represented by n bits, where n is a small integer. For example, n=0~4.

As a special case, when n=0, the decimal part of the real and imaginary coordinates (also referred to as real and imaginary coordinates or in-phase (I) and quadrature (Q) components, respectively) of each constellation point is 0. That is, the real and imaginary coordinates of each constellation point have integer values (before normalization). The normalization process is to make sure that an average power of M-QAM constellation points is 1. In an example implementation of the normalization, the power of each constellation point is calculated based on amplitudes of real and imaginary parts before normalization (for example, as listed in an amplitude level table, Table 510, 610, 710, 810, 900, 950, 1000, 1050, 1100, 1150, 1200, 1250, 1300, or 1350 in FIGS. 5-13 below). Then the total power of all constellation points (referred to as "total_power") is calculated. At last, the amplitudes of real and imaginary parts of each constellation point are divided by a normalization factor sqrt (total_power). The normalization factor sqrt(total_power) can be stored in a table for all possible modulation types. If a certain QAM is chosen for the modulation, the normalization factor can be multiplied to the modulated signal. The precision of normalization factor can be fixed-point precision, or another precision up to implementation.

An integer NUC high-order QAM can reduce the bit width for transmission and enable quick slicer operation at the receiver. For example, in some implementations, real and imaginary bit patterns of the incoming symbols of a demapper can be decoded separately. Real or imaginary amplitude is compared to the sqrt(M) values on the real or imaginary axis corresponding to the chosen M-QAM constellation. The decoded real or imaginary bit pattern is the one corresponding to real or imaginary axis value of a particular constellation point that has the minimal distance to the real or imaginary amplitude of the incoming symbol. By using an integer NUC high-order QAM, the slicer can make a mapping decision based on integer, rather than floating-point-precision, values, and therefore reduce the computational complexity and improve the efficiency.

The proposed integer NUC high-order QAM can be used in any systems that involve data modulation, including both wireless and wireline communication systems. For example, the proposed integer NUC high-order QAM can be used in cellular systems, wireless local area network (WLAN) systems, cable communication systems (e.g., Digital Video Broadcasting-Cable (DVB-C) systems), optical communication systems, and satellite systems. In a communication system, on a transmitter (TX) side, the M-QAM mapping rule can be used to encode (map) binary data bits to QAM symbols to be transmitted. On a receiver (RX) side, the M-QAM mapping rule can be used to recover (e.g., de-map) binary data from received QAM symbols.

FIG. 1 is a block diagram showing an example of a wireless communication system 100. The communication system 100 can represent a wireless local area network (WLAN) system, a cellular system, a satellite communication system, a near-field communication system, a machine-to-machine communication system, or other type of communication system. As an example, the system 100 can be a WiFi system that is configured to operate under IEEE 802.11ax protocol.

The communication system 100 can include multiple wireless communication devices 110, 120, 130, and 140 that communicate over one or more wireless channels. For example, when operating in an infrastructure mode, a wireless communication device 110 can represent an access point (AP) that provides connectivity with a network 150, such as the Internet, to other wireless communication devices 120, 130, and 140, e.g., client stations, access terminals (AT), or wireless stations (STAs).

Various examples of the wireless communication devices include mobile phones, smart phones, wireless routers, wireless hubs, etc. In some cases, wireless communication electronics are integrated with data processing equipment such as laptops, personal digital assistants, and computers.

In some implementations, one or more of the wireless communication devices 110, 120, 130, and 140 transmit signals using large modulation sizes (e.g., 1024-QAM) via one or more antennas. For example, the one or more of the wireless communication devices 110, 120, 130, and 140 can be configured to modulate and demodulate bit streams using the proposed integer NUC 1024 QAM to provide high data rates without substantial change of hardware implementations of the TX or RX.

Figure 2:
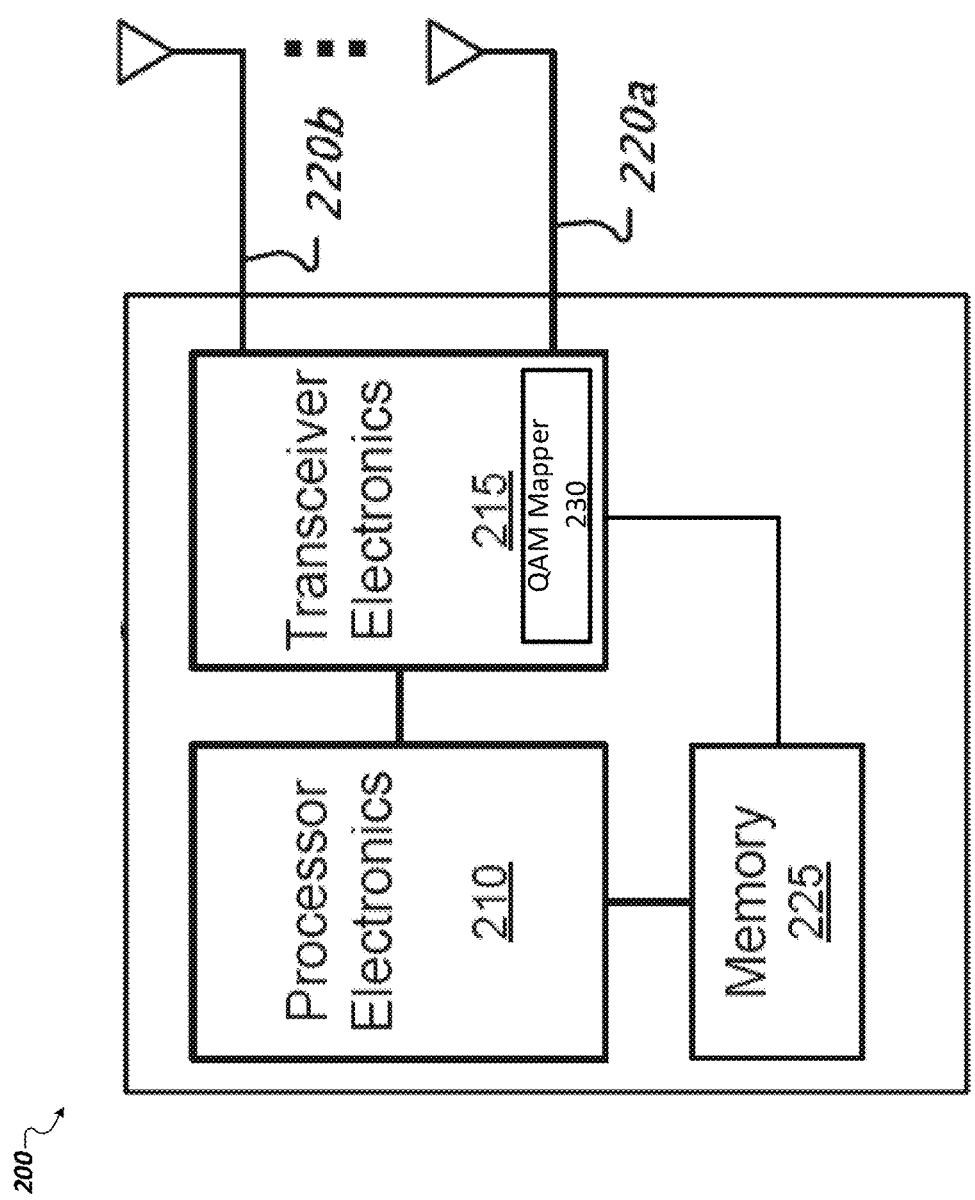
FIG. 2 shows a block diagram of an example of a wireless communication device.

FIG. 2 shows a block diagram of a wireless communication device 200. Various examples of the device 200 include an access point (AP), a base station (BS), an access terminal (AT), a client station, or a mobile station (MS). For example, the device 200 can represent one or more of the wireless communication devices 110, 120, 130, and 140 in FIG. 1, or another device.

The device 200 can include processor electronics 210, such as one or more processors that implement methods effecting the techniques presented in this disclosure. The processor electronics 210 can be operable to execute computer-readable instructions that, when executed on the processor electronics 210, cause the device 200 to implement methods effecting the techniques presented in this disclosure. For example, the processor electronics 210 can cause the device 200 to modulate or demodulate signals using the proposed integer NUC high-order QAM.

The device 200 includes transceiver electronics 215 (e.g., a transmitter, receiver, or transceiver) to send and/or receive wireless signals over one or more antennas 220a-220b. In some implementations, transceiver electronics 215 can include multiple radio units. In some implementations, a radio unit includes a baseband unit (BBU) and a radio frequency unit (RFU) to transmit and receive signals. In some implementations, the device 200 includes dedicated circuitry for transmitting (e.g., a dedicated transmitter) and dedicated circuitry for receiving (e.g., a dedicated receiver). In some implementations, the transmitter is coupled with a first processor. The first processor can be part of the processor electronics 210, when executing computer-readable instructions, cause the transmitter to modulate and transmit signals using the proposed integer NUC high-order QAM. The receiver is coupled with a second processor. The second processor can be part of the processor electronics 210, when executing computer-readable instructions, cause the receiver to receive and demodulate signals using the proposed integer NUC high-order QAM. The first processor can be the same as or different from the second processor.

In some implementations, transceiver electronics 215 can include a QAM mapper 230 (e.g., an integer NUC high-order QAM mapper) that maps bits into constellation points, and vice versa, according to a mapping rule of a specific QAM modulation scheme. For example, on the TX side, the QAM mapper 230 can be an integer NUC 1024 QAM mapper that receives a bit pattern, i.e., an array of $L=\log_2(1024)=10$ bits, $b_0$-$b_{L-1}$, and maps the particular bit pattern into one of 1024 possible constellation points according to a mapping rule of the integer NUC 1024 QAM (e.g., one of the constellation tables shown in FIGS. 6-13). The mapped constellation point may be normalized or otherwise manipulated by the transceiver electronics 215 to be transmitted as a modulated QAM signal. On the RX side, the QAM mapper 230 can be an integer NUC 1024 QAM mapper that receives a received data symbol from a received signal that is transmitted by a TX over a communication channel, determines a specific constellation point out of 1024 possible constellation points of the integer NUC 1024 QAM based on the received data symbol, and decodes or de-maps the specific constellation point to a corresponding bit pattern according to the same mapping rule used by the TX.

The device 200 can include one or more memories 225 configured to store information such as data and/or instructions (e.g., computer-readable instructions that cause the device 200 to implement methods effecting the techniques presented in this disclosure). For example, the memories 225 can store computer-readable instructions that cause the device 200 to use the proposed integer NUC high-order QAM. In some implementations, the memories 225 stores one or more constellation tables of an integer NUC high-order QAM, based on which the QAM mapper 230 can encode bit streams into constellation points for transmission and decode bit information from received constellation points.

Figure 3:
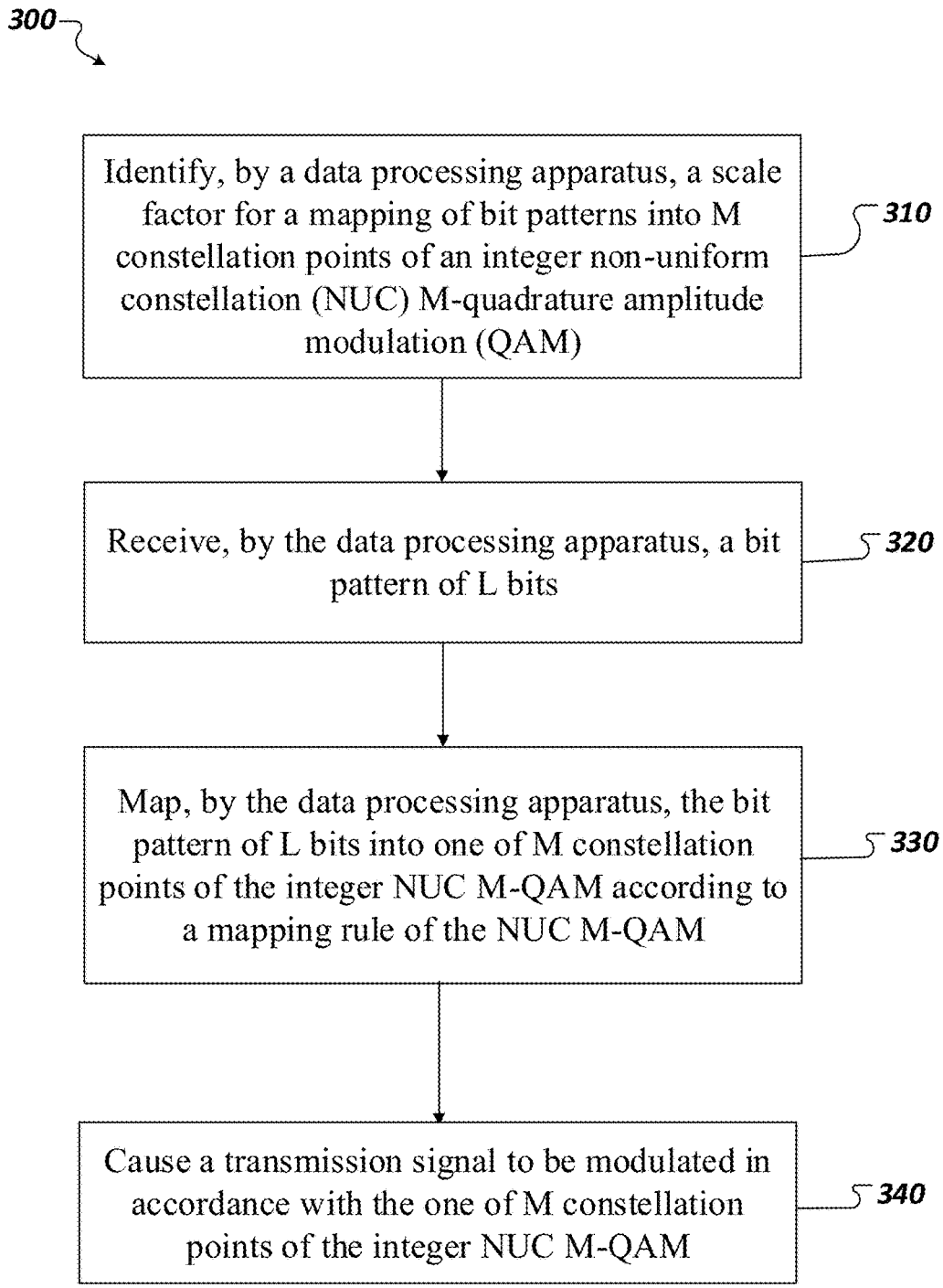
FIG. 3 is a flowchart showing a process of implementing an integer NUC high-order QAM, according to an implementation.

FIG. 3 is a flowchart showing a process 300 of implementing an integer NUC high-order QAM (e.g., an integer NUC M-QAM), according to an implementation. This process can be implemented by a wireless communication device, such as the example wireless communication device 200 in a communication system such as the system 100. In some implementations, this process can be implemented by data processing apparatus of a transmitter in a communication system.

At 310, a scale factor is identified, by a data processing apparatus, for a mapping of bit patterns into M constellation points of the integer NUC M-QAM, wherein M is no less than 1024. Each of the M constellation points of the NUC M-QAM has respective real and imaginary coordinates. For example, a constellation point $z_q$ the integer NUC M-QAM can be represented by its real and imaginary coordinates or parts, ($Re(z_q)$, $Im(z_q)$). Respective decimal parts of the respective real and imaginary coordinates are integer multiples of $2^{-n}$. In some implementations, n is a non-negative integer less than 5. The scale factor represents a common scalar that converts the respective real and imaginary coordinates of the M constellation points of the NUC M-QAM into integer real and imaginary coordinates of the M constellation points of the NUC M-QAM, for example, by multiplying the scale factor with each of the respective real and imaginary coordinates of the M constellation points of the NUC M-QAM. The scale factor can be $2^n$ for instance.

At 320, a bit pattern of L bits is received by the data processing apparatus. The bit pattern of L bits can include an ordered array of $b_0$-$b_{L-1}$ bits. The bit pattern of L bits can take $M=2^L$ different binary-value combinations, corresponding to one of M constellation points of the integer NUC M-QAM.

At 330, the bit pattern of L bits is mapped, by the data processing apparatus, into integer real and imaginary coordinates of one of M constellation points of the integer NUC M-QAM, according to a mapping rule of the integer NUC M-QAM. The integer real and imaginary coordinates of the one of the M constellation points of the NUC M-QAM equal the scale factor multiplied with respective real and imaginary coordinates of the one of the M constellation points of the NUC M-QAM having respective decimal parts. The mapping rule of the integer NUC M-QAM represents a one-to-one mapping between a specific constellation point $z_q$ and a specific bit pattern of L bits.

In some implementations, the bit pattern of L bits is mapped to amplitude levels with decimal parts (but being multiples of $2^{-n}$) as shown in Table 1000, 1050, 1100, 1150, 1200, 1250, 1300, or 1350 in FIGS. 10-13. This implementation (referred to as Option 1) may need two precisions, one for the integer part, the other for the decimal part. In some other implementations, the bit pattern of L bits is mapped to integer amplitude values by multiplying $2^n$ with each amplitude level in Tables 1000, 1050, 1100, 1150, 1200, 1250, 1300, or 1350, respectively. This implementation (referred to as Option 2) may need only one precision for the integer part. In some applications, Option 2 is preferred. Existing implementations for UC QAM only include the integer part. As such, additional memory for decimal part may be required to implement Option 1. In some applications, to accommodate Option 2, the precision of the integer part needs to be increased and results in a larger memory requirement compared to conventional UC M-QAM implementations.

At 340, a transmission signal is caused by the data processing apparatus to be modulated in accordance with the integer real and imaginary coordinates of the one of M constellation points of the integer NUC M-QAM. For example, the transmission signal is transmitted by a transmitter to a receiver over a communication channel. In some implementations, the modulated symbols (e.g., the mapped constellation points of the integer NUC M-QAM) are normalized before transmission. In some implementations, the receiver is also informed of the value of n or the scale factor. For example, the value of n or the scale factor can be predetermined and made known between the transmitter and receivers. In some implementations, the value of n or the scale factor is transmitted to the receiver, for example, as control information or piggybacked with a modulation signal that carries the one of M constellation points of the integer NUC M-QAM.

Figure 4:
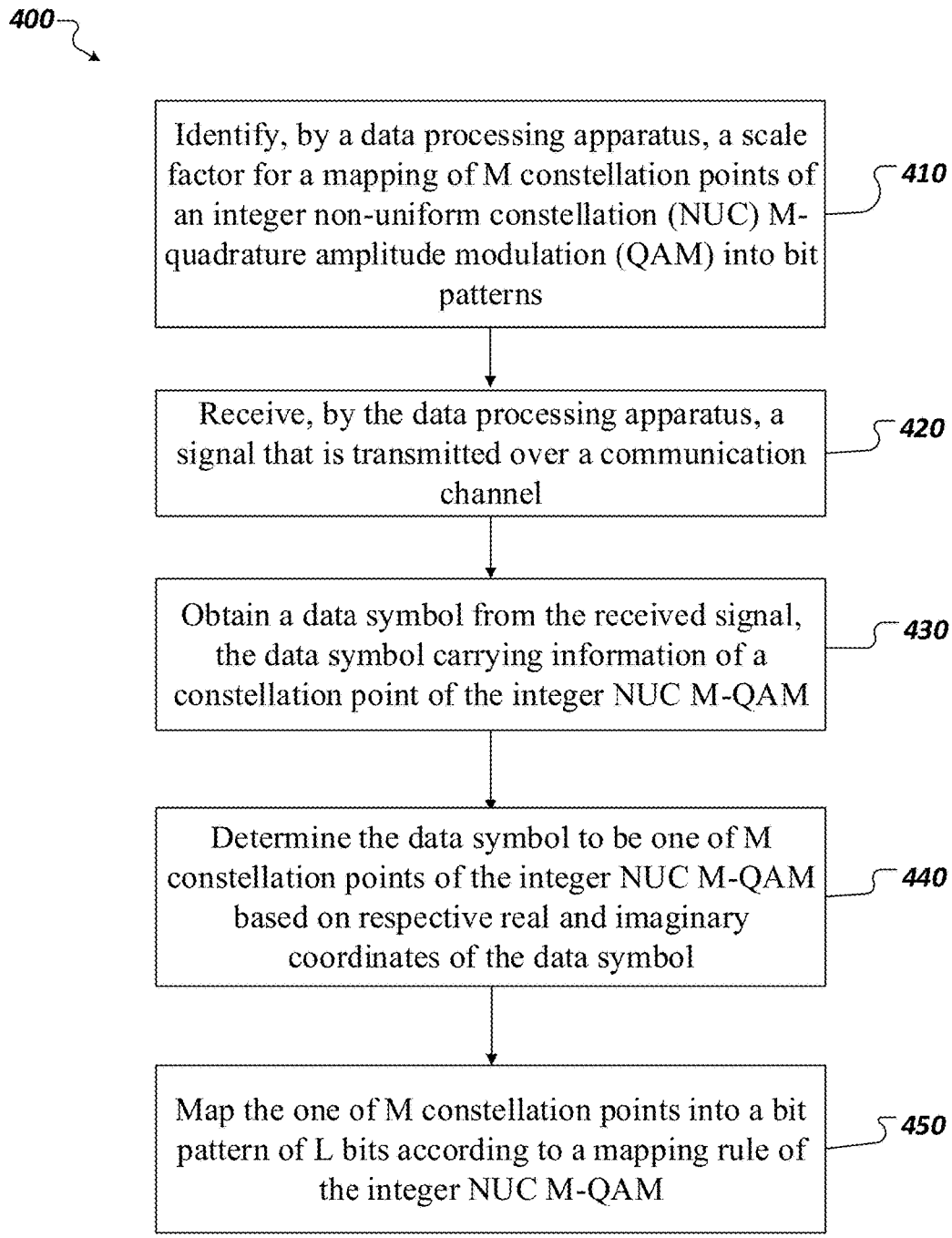
FIG. 4 is a flowchart showing another process of implementing an integer NUC high-order QAM, according to an implementation.

FIG. 4 is a flowchart showing another process 400 of implementing an integer NUC high-order QAM (e.g., an integer NUC M-QAM), according to an implementation. The integer NUC high-order QAM includes M possible constellation points. This process can be implemented by a wireless communication device, such as the example wireless communication device 200 in a communication system such as the system 100. In some implementations, this process can be implemented by data processing apparatus of a receiver in a communication system.

At 410, a scale factor is identified for a mapping of M constellation points of the integer NUC M-QAM into bit patterns, wherein M is no less than 1024. Each of the M constellation points of the NUC M-QAM has respective real and imaginary coordinates. For example, a constellation point $z_q$ of the NUC M-QAM can be represented by its real and imaginary coordinates or parts, ($Re(z_q)$, $Im(z_q)$). Respective decimal parts of the respective real and imaginary coordinates are integer multiples of $2^n$. In some implementations, n is a non-negative integer less than 5. The scale factor represents a common scalar that converts the respective real and imaginary coordinates of the M constellation points of the NUC M-QAM into integer real and imaginary coordinates of the M constellation points of the NUC M-QAM by multiplying the scale factor with each of the respective real and imaginary coordinates of the M constellation points of the NUC M-QAM. The scale factor can be $2^n$ for instance.

At 420, a signal is received by a data processing apparatus. The signal is transmitted by a transmitter, over a communication channel. The signal carries data symbols that are modulated according to the integer NUC high-order QAM.

At 430, a data symbol is obtained, by the data processing apparatus, from the received modulated signal that is transmitted over the communication channel. The data symbol carries information of a constellation point of the integer NUC QAM. The data symbol can be obtained, for example, by sampling, quantization, or other operations (e.g., equalization) that are performed by a receiver to recover a modulated symbol from a received signal.

As a specific example, an analog received signal can be sampled and quantized, for example, by an analog to digital converter (ADC). In some implementations, the quantized data symbol, say, Y can be represented by its real and imaginary coordinates or parts, (Re(Y), Im(Y)). The precision of the quantization can be up to implementations. Typically, it is of a sufficient number of bits to maintain the information from transmitter side and not to affect the precision of constellation points. For example, for the NUC M-QAM with floating-point precision, the quantization precision has to be at least floating-point precision. For the proposed integer NUC M-QAM, the quantization precision may depend on the number of bits (n) used for the decimal part of the proposed integer NUC M-QAM. For example, compared to existing implementations of the UC M-QAM, there is no change in the quantization precision for the proposed integer NUC M-QAM if n=0, while there may require an increase of the quantization precision if n>0.

The data symbol Y may be located in an arbitrary location relative to the constellation points in a constellation diagram of the integer NUC M-QAM (e.g., due to noise and interference during the transmission over the communication channel). In some implementations, other operations (e.g., equalization) can be performed before comparing and mapping Y to the constellation point of the integer NUC M-QAM.

At 440, the data symbol (e.g., Y) is determined, by the data processing apparatus, to be one of M constellation points of the integer NUC M-QAM based on respective real and imaginary coordinates of the data symbol. In some implementations, the data symbol is determined to be one of M constellation points of the integer NUC M-QAM based on respective real and imaginary coordinates of the data symbol (e.g., Re(Y), Im(Y)) and the integer real and imaginary coordinates of the one of the M constellation points of the integer NUC M-QAM. The integer real and imaginary coordinates of the one of the M constellation points of the NUC M-QAM equal the scale factor multiplied with respective real and imaginary coordinates of the one of the M constellation points of the NUC M-QAM having respective decimal parts. For example, the integer real and imaginary coordinates of the one of the M constellation points of the NUC M-QAM can result from multiplying a scale factor (e.g., $2^n$) with each of the amplitude levels in Tables 1000, 1050, 1100, 1150, 1200, 1250, 1300, or 1350, respectively.

For instance, in some implementations, in determining the data symbol to be one of the M constellation points of the integer NUC M-QAM, the data symbol Y (including its decimal part) is compared with each amplitude level (including the decimal parts) in Table 1000, 1050, 1100, 1150, 1200, 1250, 1300, or 1350. This implementation (referred to as Option A) may need two precisions, one for the integer part, the other for the decimal part. In some other implementations, a scale factor (e.g., $2^n$) is multiplied with the data symbol Y and the resulting $Y*2^n$ is compared with integer real and imaginary coordinates of the one of the M constellation points of the NUC M-QAM (e.g., integer values resulting from multiplying $2^n$ with each amplitude level in Tables 1000, 1050, 1100, 1150, 1200, 1250, 1300, or 1350, respectively). This implementation (referred to as Option B) may need only one precision for the integer part. In some applications, Option 2 is preferred. Existing implementations for UC M-QAM only include the integer part. As such, additional memory for the decimal part may be required to implement Option A. In some applications, to accommodate Option B, the precision of the integer part needs to be increased and results in a larger memory requirement compared to conventional UC M-QAM implementations. However, both implementations can reduce the precision requirement compared to non-integer NUC M-QAM implementations. For example, Option A can be implemented with a fixed-point precision with $n<=4$, whereas the non-integer NUC 1024-QAM described in connection with FIG. 5 requires at least $n=14$ to represent the decimal part.

In some implementations, determining the data symbol to be one of the M constellation points of the integer NUC M-QAM includes respective distances between the data symbol and each of M constellation points of the NUC M-QAM, for example, according to a maximum likelihood or a maximum a posteriori (MAP) principle. As an example, the one of M constellation points of the integer NUC M-QAM is determined as the constellation point that has the minimum distance from the data symbol.

At 450, the one of M constellation points is mapped, by the data processing apparatus, into a bit pattern of L bits according to a mapping rule of the integer NUC M-QAM. $L=\log_2(M)$. The bit pattern of L bits can include an ordered array of $b_0$-$b_{L-1}$ bits. The mapping rule of the integer NUC M-QAM represents a one-to-one mapping between a specific constellation point $z_q$ and a specific bit pattern of L bits.

As an example, for the process 300 or 400, M=1024 and L=10. The mapping rule of the integer NUC M-QAM can be any of the mapping rules of the integer NUC 1024-QAM described in connection with FIGS. 6-13 below. As a specific example, n is 0. In other words, each of the real and imaginary coordinates of constellation point of the integer NUC M-QAM are of integer values (having a decimal part of 0). Accordingly, the mapping rule of the integer NUC M-QAM can be any of the mapping rules 600, 700, or 800 of the integer NUC 1024-QAM described in connection with FIGS. 6-8. In some implementations, amplitudes of the respective integer parts of the respective real and imaginary coordinates are determined based on amplitudes of integer parts of respective real and imaginary coordinates of a non-integer NUC M-QAM as shown in Table 510 in FIG. 5. In some implementations, the respective amplitudes of integer parts of the respective real and imaginary coordinates are from a first set of [1, 3, 5, 7, 9, 11, 13, 16, 18, 21, 23, 26, 29, 32, 36, and 40] as shown in Table 610 in FIG. 6, a second set of [1, 3, 5, 7, 9, 12, 14, 17, 19, 22, 24, 27, 30, 34, 37, and 40] as shown in Table 710 in FIG. 7, a third set of [1, 3, 5, 7, 9, 12, 15, 18, 21, 24, 27, 30, 33, 36, 39, and 42] as shown in Table 810 in FIG. 8, a fourth set of [1, 3, 5, 7, 9, 11, 13, 16, 18, 21, 23, 26, 28, 32, 36, and 40] as shown in Table 900 in FIG. 9, or a fifth set of [1, 3, 5, 7, 9, 11, 13, 15, 17, 20, 23, 26, 29, 32, 36, and 40] as shown in Table 950 in FIG. 9.

Figure 5:
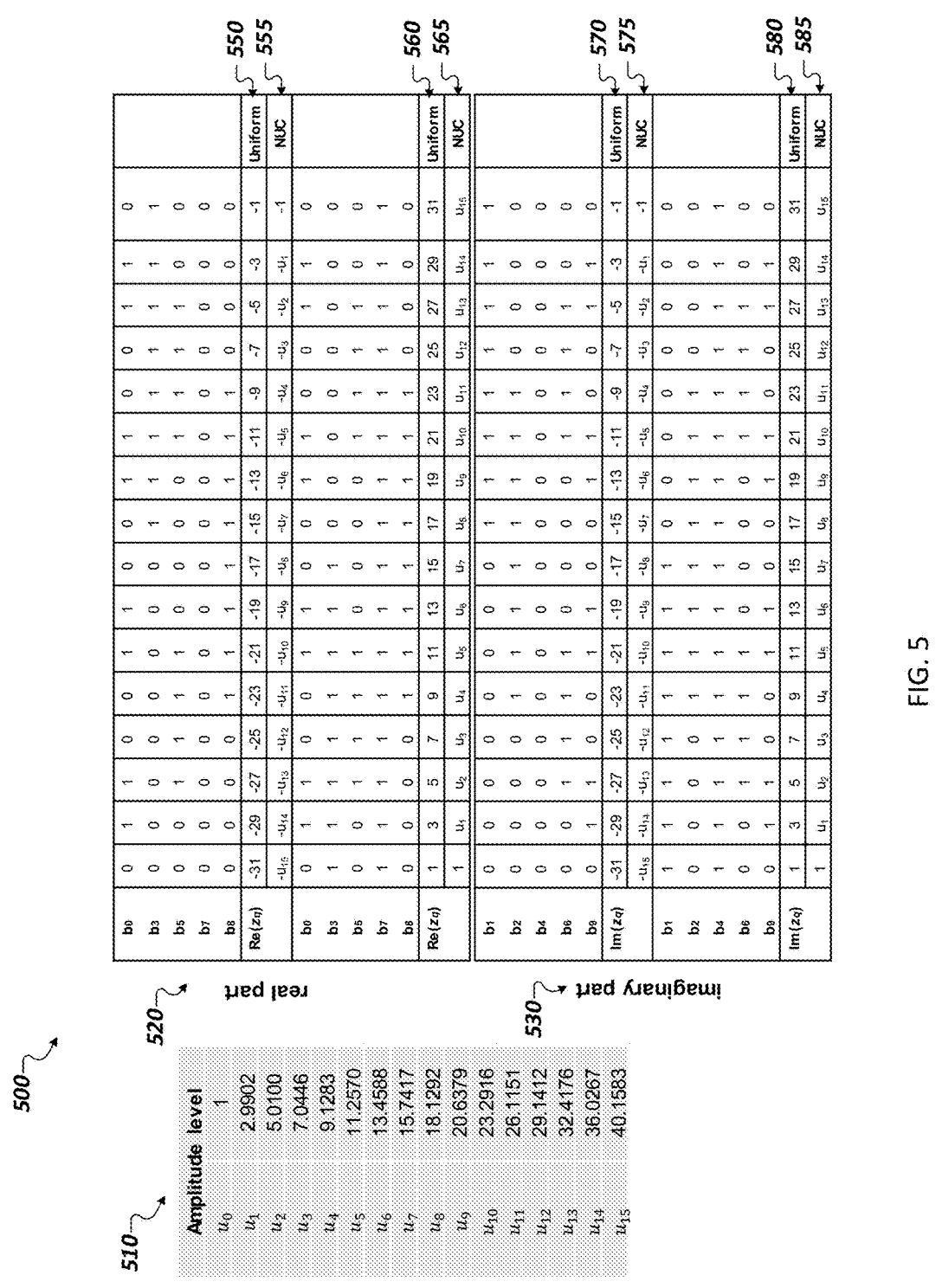

FIG. 5 is a diagram showing an example of a mapping rule 500 of a non-integer NUC 1024 QAM, according to an implementation. A non-integer NUC 1024 QAM refers to a NUC 1024 QAM whose constellation points cannot be accurately represented by a small integer number of bits, such as a NUC 1024 QAM whose constellation points are represented in fixed-point precision that requires at least 20 bits for each coordinate (6 bit for integer part, 14 bits for decimal part) or floating-point precision that requires, for example, 32 or more bits to represent the values of the real and imaginary coordinates of the constellation points. The mapping rule 500 of the non-integer NUC 1024 QAM shows a one-to-one mapping between a constellation point $z_q$ (represented by its real and imaginary parts or coordinates, ($Re(z_q)$, $Im(z_q)$) and an ordered array of 10 bits (i.e., a 10-bit bit pattern, ($b_0$, $b_3$, $b_5$, $b_7$, $b_8$; $b_1$, $b_2$, $b_4$, $b_6$, $b_9$), wherein $b_0$ is the least significant bit (LSB) and $b_9$ is the most significant bit (MSB)).

In this example, the real part and imaginary part of the constellation point each map to a 5-bit bit pattern. Accordingly, each of the $Re(z_q)$ and $Im(z_q)$ takes one of $2^5=32$ different values, corresponding to one of 32 binary bit combinations of a 5-bit bit pattern. Specifically, a mapping table 520 shows a one-to-one mapping between $Re(z_q)$ and a 5-bit bit pattern ($b_0$, $b_3$, $b_5$, $b_7$, $b_8$) of the non-integer NUC 1024 QAM. A mapping table 530 shows a one-to-one mapping between $Im(z_q)$ and a 5-bit bit pattern ($b_1$, $b_2$, $b_4$, $b_6$, $b_9$).

In this example, the 32 different values of each of the $Re(z_q)$ and $Im(z_q)$ include symmetric positive and negative values of a same vector having 16 different amplitude levels. For reference and comparison, the mapping table 520 shows both uniform constellation (UC) and NUC cases. Specifically, for a UC 1024 QAM, the real part (or coordinate) of a constellation point, $Re(z_q)$, takes a value of out of 32 different equally-spaced values, −31, −29, −27, −25, −23, −21, −19, −17, −15, −13, −11, −9, −7, −5, −3, −1, 1, 3, 5, 7, 9, 11, 13, 15, 17, 19, 21, 23, 25, 27, 29, and 31, as shown in rows 550 and 560, respectively. Any two adjacent values of $Re(z_q)$ of the UC 1024 QAM have an equal difference of 2 in this example. By contrast, for a non-integer NUC 1024 QAM, the real part (or coordinate) of a constellation point, $Re(z_q)$, takes a value of out of 32 different non-equallyspaced values, $-u_{15}, -u_{14}, -u_{13}, -u_{12}, -u_{11}, -u_{10}, -u_9, -u_8, -u_7, -u_6, -u_5, -u_4, -u_3, -u_2, -u_1, -u_0, u_0, u_1, u_2, u_3, u_4, u_5, u_6, u_7, u_8, u_9, u_{10}, u_{12}, u_{13}, u_{14}, u_{15}$, as shown in rows 555 and 565. Table 510 shows the values of the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, wherein not all the differences of two adjacent amplitude levels are the same.

Similarly, the mapping table 530 shows one-to-one mapping between $Im(z_q)$ and a 5-bit bit pattern $(b_1, b_2, b_4, b_6, b_9)$ for both UC 1024 QAM and the non-integer NUC 1024 QAM. Specifically, for a UC 1024 QAM, the imaginary part (or coordinate) of a constellation point, $Im(z_q)$, takes a value of out of 32 different equally-spaced values, $-31, -29, -27, -25, -23, -21, -19, -17, -15, -13, -11, -9, -7, -5, -3, -1, 1, 3, 5, 7, 9, 11, 13, 15, 17, 19, 21, 23, 25, 27, 29,$ and $31$, as shown in rows 570 and 580, respectively. By contrast, for the non-integer NUC 1024 QAM, the imaginary part (or coordinate) of a constellation point, $Im(z_q)$, takes a value of out 32 different non-equally-spaced values, $-u_{15}, -u_{14}, -u_{13}, -u_{12}, -u_{11}, -u_{10}, -u_9, -u_8, -u_7, -u_6, -u_5, -u_4, -u_3, -u_2, -u_1, -u_0, u_0, u_1, u_2, u_3, u_4, u_5, u_6, u_7, u_8, u_9, u_{10}, u_{11}, u_{12}, u_{13}, u_{14}, u_{15}$, as shown in rows 575 and 585. The values of the 16 different amplitude levels, $u_0, u_1, u_2, u_3, u_4, u_5, u_6, u_7, u_8, u_9, u_{10}, u_{11}, u_{12}, u_{13}, u_{14}, u_{15}$ are also shown in Table 510.

The non-integer NUC 1024 QAM has been shown to have performance gain over the UC 1024 QAM for both additive white Gaussian noise (AWGN) and fading channels. However, as shown in Table 510, the amplitudes of the real and imaginary part of each non-uniform constellation of the non-integer NUC 1024 QAM have decimal numbers (or parts) which requires a large number of bits to represent in fixed-point precision or floating-point precision. This will add significant complexities in chip design for 1024-QAM modulation and demodulation. Besides, the decimal parts may have to be quantized to certain precision smaller than the required full precision number in real implementations. Thus, optimized performance may not be achievable using the NUC 1024 QAM.

Integer NUC 1024 QAM is proposed to simplify the chip design (for example, by reusing existing hardware design of TXs and RXs that are used for UC QAM, as much as possible) while substantially maintaining the performance improvement of NUC over UC QAM. For example, the existing hardware design of TXs and RXs used for UC QAM only have the precision for integer part, which is log 2(M) bits for M-QAM. For integer NUC M-QAM, if n=0, the existing hardware does not have to change, except the precision of the integer part may need to increase 1 bit for 1024-QAM, i.e., from 5 bits to 6 bits to accommodate value greater than 31 and smaller than 64. For n>0, then the precision of the integer part may need to increase n+1 bits to include the scaling factor $2^n$.

The proposed integer NUC 1024 QAM has a precision of a finite integer number of bits such that each of the constellation points, especially their decimal parts, can be accurately represented by n bits, where n is a small integer. For example, n is less than 5. As an example of the proposed integer NUC 1024 QAM, any decimal part of real and imaginary coordinates of each constellation point is an integer multiple of $2^{-n}$. As another example, the smallest absolute value for the integer part of an integer NUC 1024 QAM constellation point is $2^n$ (instead of 1). For example, if the amplitude level in the amplitude level table (e.g., Table 1000, 1050, 1100, 1150, 1200, 1250, 1300, or 1350) is multiplied by a scale factor $2^n$, the value 1 in the integer part becomes $2^n$. FIGS. 6-13 show examples of integer NUC 1024 QAM, where n equals 0, 1, 2, 3, or 4, respectively.

Figure 6:
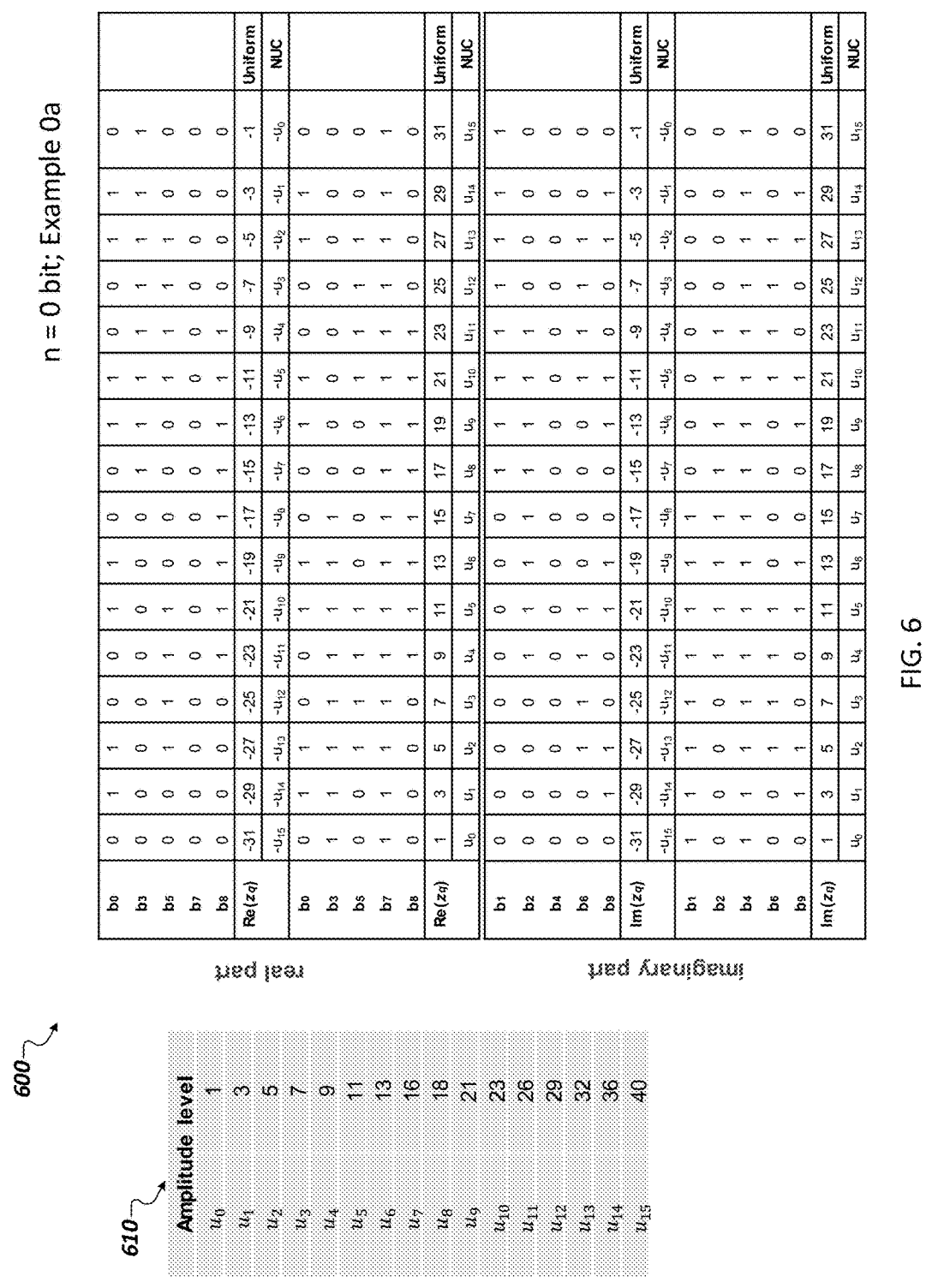

FIG. 6 is a diagram showing a mapping rule 600 of an integer NUC 1024 QAM when n equals 0, according to an implementation (referred to as Example 0a). In other words, each constellation point of this integer NUC 1024 QAM has integer values (for both real and imaginary parts). The mapping rule 600 is similar to the mapping rule 500 of the non-integer NUC 1024 QAM in FIG. 5, except for a different amplitude mapping Table 610.

Specifically, Table 610 shows values of the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, all of which are integer values. As such, no bit (n=0) is required to represent the decimal parts of each constellation point. The integer amplitude levels can be determined based on the non-integer amplitude levels of the non-integer NUC 1024 QAM as shown in Table 510. In some implementations, the latter can be used as a baseline, and each value of the latter can be rounded up or down to form a candidate set of integer amplitude levels. Simulations can be performed using the proposed integer NUC 1024 QAM with various candidate sets of integer amplitude levels under different channel conditions (e.g., an AWGN channel, fading channel, or any other more realistic channels). The candidate set that returns the best or better error performance (e.g., resulting in a minimum packet error rate (PER)), or returns a similar error performance to that of the non-integer NUC 1024 QAM can be chosen as a selected set of integer amplitude levels for an integer NUC 1024 QAM.

Table 610 is an example of the selected set of integer amplitude levels for an integer NUC 1024 QAM. As shown in Table 610, the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, correspond to a first set of [1, 3, 5, 7, 9, 11, 13, 16, 18, 21, 23, 26, 29, 32, 36, and 40].

Figure 7:
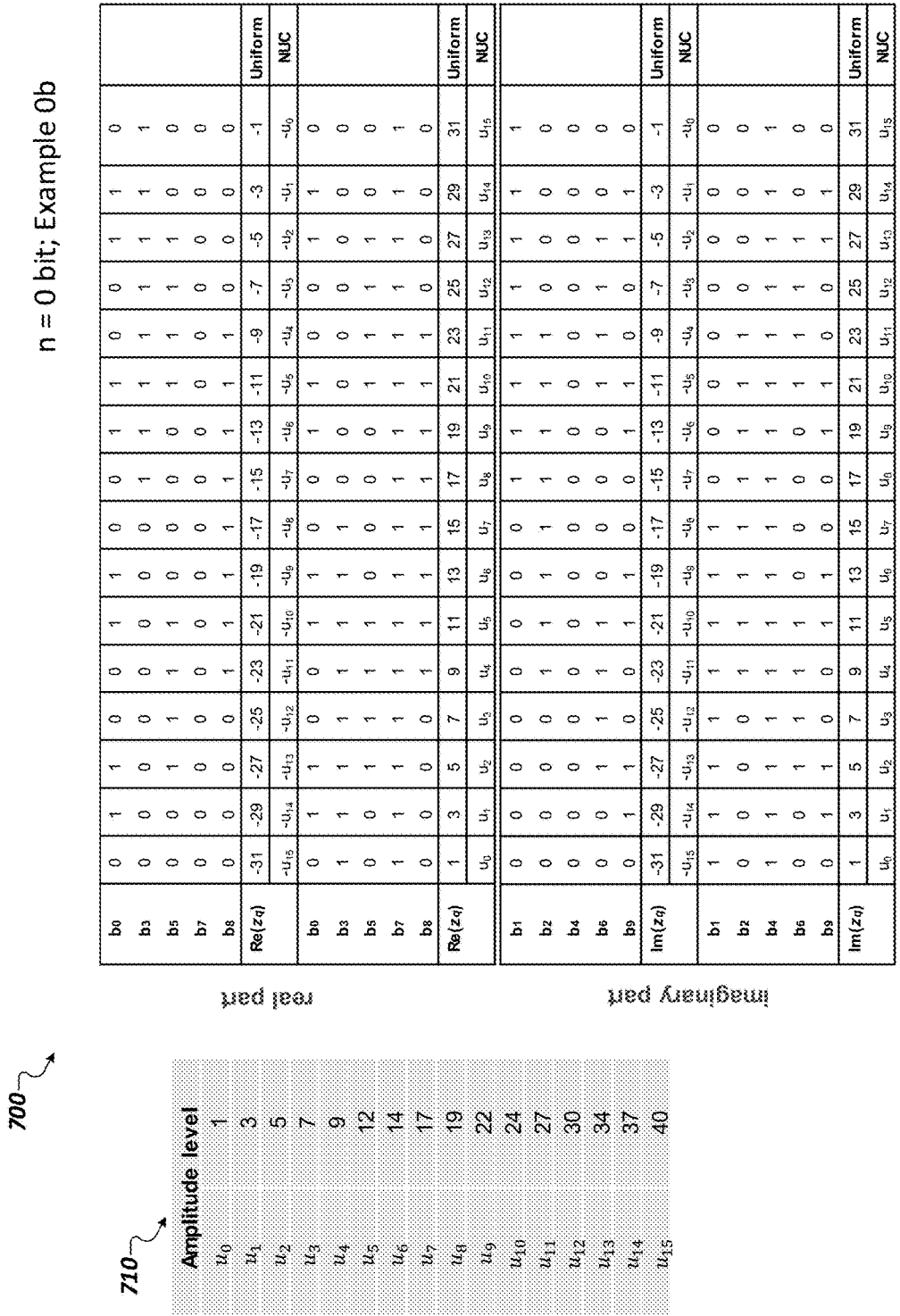
FIG. 7 is a diagram showing a mapping rule of an integer NUC 1024 QAM when n equals 0, according to another implementation.

FIG. 7 is a diagram showing a mapping rule 700 of an integer NUC 1024 QAM when n equals 0, according to an implementation (referred to as Example 0b). The mapping rule 700 is similar to the mapping rule 500 of the non-integer NUC 1024 QAM in FIG. 5, except a different amplitude mapping Table 710. Table 710 is another example of the selected set of integer amplitude levels for an integer NUC 1024 QAM. As shown in Table 710, the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, correspond to a second set of [1, 3, 5, 7, 9, 12, 14, 17, 19, 22, 24, 27, 30, 34, 37, and 40].

Figure 8:
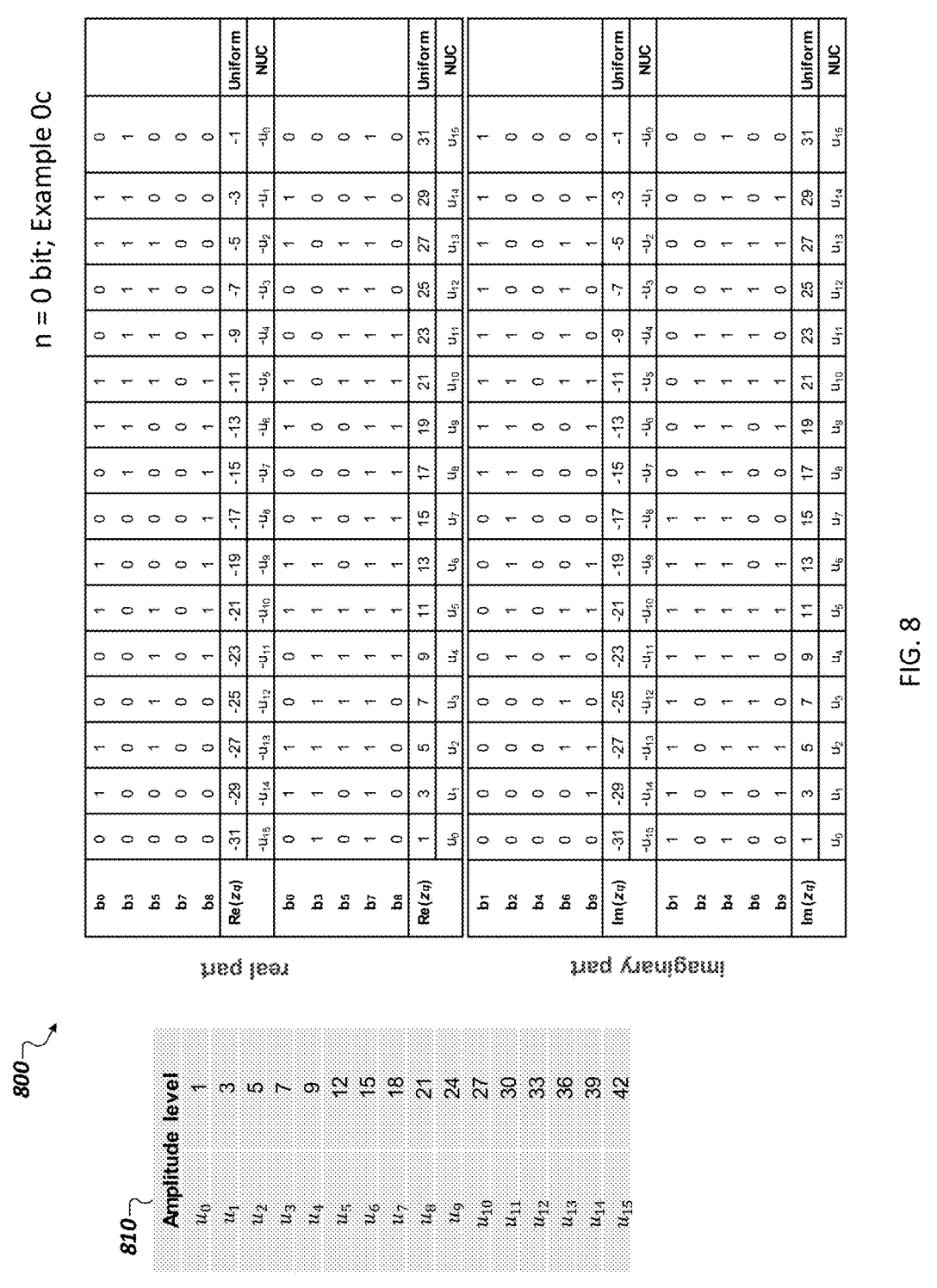

FIG. 8 is a diagram showing a mapping rule 800 of an integer NUC 1024 QAM when n equals 0, according to an implementation (referred to as Example 0c). The mapping rule 800 is similar to the mapping rule 500 of the non-integer NUC 1024 QAM in FIG. 5, except for a different amplitude mapping Table 810. Table 810 is another example of the selected set of integer amplitude levels for an integer NUC 1024 QAM. As shown in Table 810, the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, correspond to a third set of [1, 3, 5, 7, 9, 12, 15, 18, 21, 24, 27, 30, 33, 36, 39 and 42].

FIG. 9 is a diagram showing another two amplitude mapping tables, Table 900 and Table 950, for an integer NUC 1024 QAM when n equals 0, according to two implementations (referred to as Example 0d and Example 0e). Each of the amplitude mapping tables can be used with the mapping rule 500 of the non-integer NUC 1024 QAM to replace the non-integer amplitude mapping table, Table 510. As shown in Table 900, the 16 different amplitude levels, $u_0, u_1, u_2, u_3, u_4, u_5, u_6, u_7, u_8, u_9, u_{10}, u_{11}, u_{12}, u_{13}, u_{14}, u_{15}$, correspond to a fourth set of [1, 3, 5, 7, 9, 11, 13, 16, 18, 21, 23, 26, 28, 32, 36, and 40]. As shown in Table 950, the 16 different amplitude levels, $u_0, u_1, u_2, u_3, u_4, u_5, u_6, u_7, u_8, u_9$, $u_{10}$, $u_{11}$, $u_{12}$, $u_{13}$, $u_{14}$, $u_{15}$, correspond to a fifth set of [1, 3, 5, 7, 9, 11, 13, 15, 17, 20, 23, 26, 29, 32, 36, and 40].

FIG. 10 is a diagram showing two amplitude mapping tables, Table 1000 and Table 1050, for an integer NUC 1024 QAM when n equals 1, according to two implementations (referred to as Example 1a and Example 1b). As shown in Table 1000, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9, 11.5, 13.5, 15.5, 18, 20.5, 23.5, 26, 29, 32.5, 36, 40]. As shown in Table 1050, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9, 11, 13, 15.5, 18, 20.5, 23, 26, 29, 32.5, 36, 40]. Each of the amplitude mapping tables can be used with the mapping rule 500 of the non-integer NUC 1024 QAM to replace the non-integer amplitude mapping table, Table 510.

In these examples, 1 bit is used to represent the decimal parts of the real and imaginary parts of each constellation point. Table 1000 and Table 1050 can be equivalently represented as integer tables such that each amplitude level is an integer value by multiplying each value in Table 1000 and Table 1050 by $2^1=2$. The integer amplitude levels can be determined based on the non-integer amplitude levels of the non-integer NUC 1024 QAM, as shown in Table 510. In some implementations, the latter can be used as a baseline, and each decimal part value of the latter can be represented by either 0.0 or $2^{-n}=2^1=0.5$ to form a candidate set of amplitude levels. For example, each decimal part is an integer multiple of $2^{-1}=0.5$, i.e., either 0 or 0.5. Simulations can be performed using the proposed integer NUC 1024 QAM with various candidate sets of amplitude levels under different channel conditions (e.g., an AWGN channel, fading channel, or any other more realistic channels). The candidate set that returns the best or better error performance (e.g., resulting in a minimum packet error rate (PER)), or returns a similar error performance to that of the non-integer NUC 1024 QAM can be chosen as a selected set of amplitude levels for an integer NUC 1024 QAM with n=1.

FIG. 11 is a diagram showing two amplitude mapping tables, Table 1100 and Table 1150, for an integer NUC 1024 QAM when n equals 2, according to two implementations (referred to as Example 2a and Example 2b). As shown in Table 1100, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9.25, 11.25, 13.5, 15.75, 18.25, 20.75, 23.25, 26, 29.25, 32.5, 36, 40.25]. As shown in Table 1150, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9.25, 11.5, 13.75, 16, 18.5, 21, 23.5, 26.25, 29.25, 32.5, 36, 40.25].

Each of the amplitude mapping tables can be used with the mapping rule 500 of the non-integer NUC 1024 QAM to replace the non-integer amplitude mapping table, Table 510.

In these examples, 2 bits are used to represent the decimal parts of the real and imaginary parts of each constellation point. Table 1100 and Table 1150 can be equivalently represented as integer tables such that each amplitude level is an integer value by multiplying each value in Table 1100 and Table 1150 by $2^2=4$. The integer amplitude levels can be determined based on the non-integer amplitude levels of the non-integer NUC 1024 QAM, as shown in Table 510. In some implementations, the latter can be used as a baseline, and each decimal part value of the latter can be represented by an integer multiple of $2^{-n}=2^{-2}=0.25$ to form a candidate set of amplitude levels. For example, each decimal part is an integer multiple of $2^{-2}=0.25$, i.e., either 0, 0.25, 0.5 or 0.75. Simulations can be performed using the proposed integer NUC 1024 QAM with various candidate sets of amplitude levels under different channel conditions (e.g., an AWGN channel, fading channel, or any other more realistic channels). The candidate set that returns the best or better error performance (e.g., resulting in a minimum packet error rate (PER)), or returns a similar error performance to that of the non-integer NUC 1024 QAM can be chosen as a selected set of amplitude levels for an integer NUC 1024 QAM with n=2.

FIG. 12 is a diagram showing two amplitude mapping tables, Table 1200 and Table 1250, for an integer NUC 1024 QAM when n equals 3, according to two implementations (referred to as Example 3a and Example 3b). As shown in Table 1200, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9.125, 11.25, 13.5, 15.75, 18.125, 20.625, 23.25, 26.125, 29.125, 32.375, 36, 40.125]. As shown in Table 1250, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7, 9.125, 11.25, 13.5, 15.75, 18.125, 20.625, 23.25, 26, 29, 32.25, 36.75, 40.5]. Each of the amplitude mapping tables can be used with the mapping rule 500 of the non-integer NUC 1024 QAM to replace the non-integer amplitude mapping table, Table 510.

In these examples, 3 bits are used to represent the decimal parts of the real and imaginary parts of each constellation point. Table 1200 and Table 1250 can be equivalently represented as integer tables such that each amplitude level is an integer value by multiplying each value in Table 1000 and Table 1050 by $2^3=8$. The integer amplitude levels can be determined based on the non-integer amplitude levels of the non-integer NUC 1024 QAM as shown in Table 510. In some implementations, the latter can be used as a baseline, and each decimal part value of the latter can be represented by an integer multiple of $2^{-n}=2^{-3}=0.125$ to form a candidate set of amplitude levels. For example, each decimal part is an integer multiple of $2^3=0.125$, i.e., either 0, 0.125, 0.25, 0.375, 0.5, 0.625, 0.75, or 0.875. Simulations can be performed using the proposed integer NUC 1024 QAM with various candidate sets of amplitude levels under different channel conditions (e.g., an AWGN channel, fading channel, or any other more realistic channels). The candidate set that returns the best or better error performance (e.g., resulting in a minimum packet error rate (PER)), or returns a similar error performance to that of the non-integer NUC 1024 QAM can be chosen as a selected set of amplitude levels for an integer NUC 1024 QAM with n=3.

FIG. 13 is a diagram showing two amplitude mapping tables, Table 1300 and Table 1350, for an integer NUC 1024 QAM when n equals 4, according to two implementations (referred to as Example 4a and Example 4b). As shown in Table 1300, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7.0625, 9.125, 11.25, 13.4375, 15.75, 18.125, 20.625, 23.3125, 26.125, 29.125, 32.4375, 36, 40.1875]. As shown in Table 1350, the 16 different amplitude levels, $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, $u_{15}$, correspond to a set of [1, 3, 5, 7.0625, 9.125, 11.25, 13.4375, 15.6875, 18.0625, 20.5625, 23.1875, 26, 29.0625, 32.4375, 36.1875, 40.375]. Each of the amplitude mapping tables can be used with the mapping rule 500 of the non-integer NUC 1024 QAM to replace the non-integer amplitude mapping table, Table 510.

In these examples, 4 bits are used to represent the decimal parts of the real and imaginary parts of each constellation point. Table 1200 and Table 1250 can be equivalently represented as integer tables such that each amplitude level is an integer value by multiplying each value in Table 1300 and Table 1350 by $2^4=16$. The integer amplitude levels can be determined based on the non-integer amplitude levels of the non-integer NUC 1024 QAM, as shown in Table 510. In some implementations, the latter can be used as a baseline, and each decimal part value of the latter can be represented by an integer multiple of $2^{-n}=2^{-4}=0.0625$ to form a candidate set of amplitude levels. For example, each decimal part is an integer multiple of $2^4=0.0625$, i.e., either 0, 0.0625, 0.125, 0.1875, 0.25, 0.3125, 0.375, 0.4375, 0.5, 0.5625, 0.625, 0.6875, 0.75, 0.8125, 0.875, or 0.9375. Simulations can be performed using the proposed integer NUC 1024 QAM with various candidate sets of amplitude levels under different channel conditions (e.g., an AWGN channel, fading channel, or any other more realistic channels). The candidate set that returns the best or better error performance (e.g., resulting in a minimum packet error rate (PER)), or returns a similar error performance to that of the non-integer NUC 1024 QAM can be chosen as a selected set of amplitude levels for an integer NUC 1024 QAM with n=4.

In some implementations, each of the amplitude mapping tables shown in FIGS. 6-13 can be used with a mapping rule different of a NUC 1024 QAM from the mapping rule 500 shown in FIG. 5. For example, another mapping rule that includes another bit mapping between the constellation point $z_q$, represented by $(Re(z_q), Im(z_q))$, and a 10-bit bit pattern with a different order of the 10 bits than that of ($b_0$, $b_3$, $b_5$, $b_7$, $b_8$; $b_1$, $b_2$, $b_4$, $b_6$, $b_9$) as shown in FIG. 5.

In order to detect high-order modulated signals in wireless communication, iterative decoding such as turbo or turbo-like channel decoding is used in some implementations. The iterative decoding relies on bitwise log-likelihood ratio (LLR) from a demodulator (e.g., implemented by the processor electronics 210 or transceiver electronics 215 that include the QAM mapper 230 as shown in FIG. 2). The LLR metric of the kth bit, $\Lambda(b_k)$, conditioned on a received signal sample $\hat{b}$ (e.g., a quantized data symbol Y from a received signal) is defined as $$\Lambda(b_k) = \ln \frac{\sum_{b_k \in S_1} Pr(b_k=1)p(\hat{b}|b_k=1)}{\sum_{b_k \in S_0} Pr(b_k=0)p(\hat{b}|b_k=0)} \quad (1)$$

$S_1$ denotes the set of modulation symbols having binary value 1 at current bit position k; $S_0$ denotes the set of modulation symbols having binary value 0 at current bit position k. $b_k$ is the kth bit value in an M-QAM data symbol. $Pr(b_k=1)$ denotes the a-priori probability of current bit position k having binary value 1. $Pr(b_k=0)$ denotes the a-priori probability of current bit position k having binary value 0. $p(\hat{b}|b_k=1)$ denotes the conditional probability density of received signal sample $\hat{b}$, given current bit position k having binary value 1. $p(\hat{b}|b_k=0)$ denotes the conditional probability density of received signal sample $\hat{b}$, given current bit position k having binary value 0. For binary phase-shift keying (BPSK) and quadrature phase-shift keying (QPSK), the LLR metric of each bit is a linear function of the received signal sample, except some saturation that may be applied in hardware implementation. However, for 16 QAM, 64 QAM, 256 QAM and 1024 QAM, the LLR metric of each bit is a continuous piecewise function of the received signal sample. Due to the fact that each bit of an M-QAM symbol may have different levels of reliability, the LLR metric of each bit corresponds to a different piecewise function, which may be nonlinear. The higher order the M-QAM, then the piecewise function corresponding to the LLR metric of a given bit includes more pieces. In hardware design, this translates to more fixed point precisions to represent all possible slopes for each piece.

Compared to current UC 1024 QAM, LLR metric calculation for NUC 1024 QAM (e.g., the non-integer NUC 1024 QAM as discussed in connection with FIG. 5) requires more pieces for piecewise function. If the non-integer NUC 1024 QAM uses the same fixed point precision as UC 1024 QAM, the estimation error from approximating nonlinear piecewise function to linear piecewise function is larger, resulting in larger PER performance degradation of the non-integer NUC 1024 QAM. Despite simulation results show that NUC 1024 QAM has gain over UC 1024 QAM for both additive white Gaussian noise (AWGN) and fading channels, to realize the gain from non-integer NUC 1024 QAM, more fixed point precisions should be added for LLR metrics calculation for the non-integer NUC 1024 QAM. Compared to non-integer NUC 1024 QAM, the proposed integer NUC 1024 QAM requires much less fixed point precision, with negligible PER performance loss.

Figure 14:
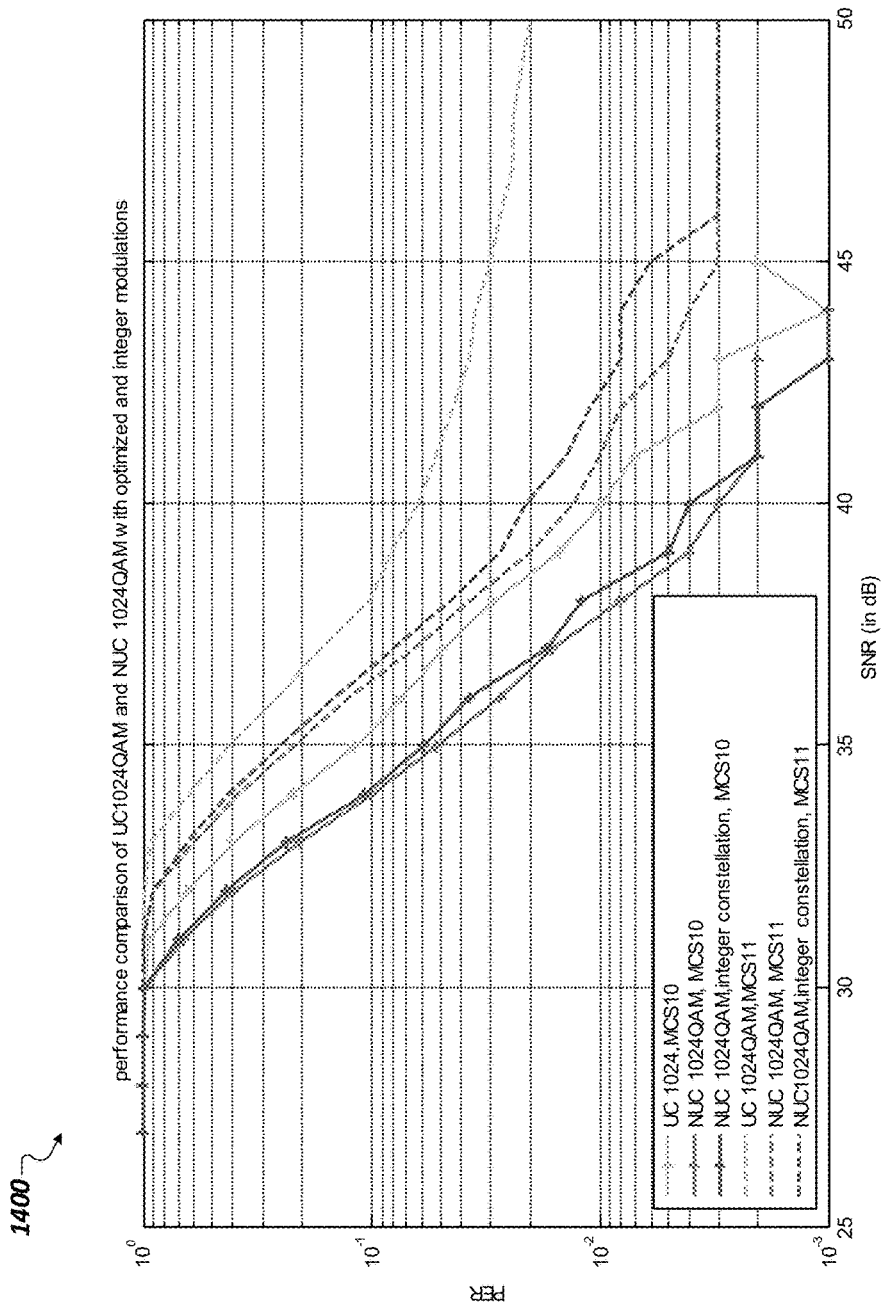
FIG. 14 is a plot showing performance comparison of uniform constellation (UC) 1024 QAM, non-integer NUC 1024 QAM and integer NUC 1024 QAM, according to a simulation.

FIG. 14 is a plot 1400 showing performance comparison of UC 1024 QAM, non-integer NUC 1024 QAM and integer NUC 1024 QAM, according to a simulation. The PER performances of UC 1024 QAM, non-integer NUC 1024 QAM (denoted as "NUC 1024QAM" in the legend of FIG. 14) and integer NUC 1024 QAM (denoted as "NUC 1024QAM, integer constellation" in the legend of FIG. 14) are shown in the plot 1400 for two modulation and coding schemes (MCSs), MCS 10 and MCS 11, on D-band non-line-of-sight (NLOS) channel with carrier frequency offset (CFO) and phase noise (PN). As defined in IEEE 802.11ac, MCS 10 uses 1024 QAM with ¾ code rate (CR), and MCS 11 uses 1024 QAM with ⅚ code rate.

Figure 15:
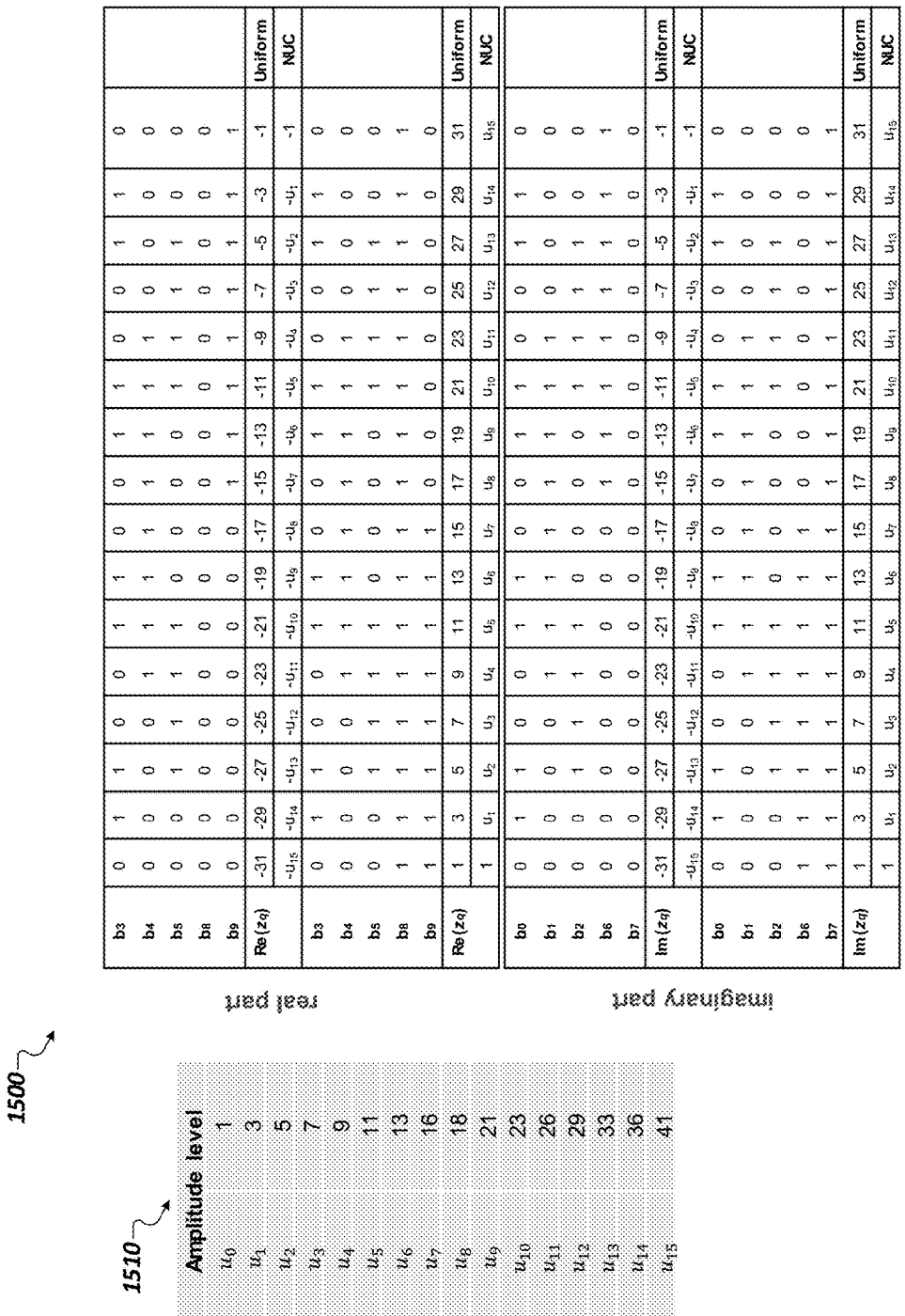
FIG. 15 is a diagram showing an example of a mapping rule of an integer NUC 1024 QAM for modulation and coding scheme (MCS) 10, according to an implementation.

In the simulation, the integer NUC 1024 QAM used for MCS 10 is shown in FIG. 15, with a mapping rule 1500 and integer amplitudes of respective real and imaginary coordinates in Table 1510. The integer NUC 1024 QAM used for MCS 11 is shown in FIG. 16, with a mapping rule 1600 and integer amplitudes of respective real and imaginary coordinates in Table 1610. The non-integer NUC 1024 QAM used for MCS 10 is shown in FIG. 17, with a mapping rule 1700 and optimized constellation having non-integer amplitudes of respective real and imaginary coordinates in Table 1710. The non-integer NUC 1024 QAM used for MCS 11 is shown in FIG. 18, with a mapping rule 1800 and optimized constellation having non-integer amplitudes of respective real and imaginary coordinates in Table 1810.

Performance of the integer NUC 1024 QAM with constellation points quantized to integer numbers for NUC 1024 QAM was simulated and compared to that of the non-integer NUC 1024 QAM with optimized constellations. As shown in FIG. 14, the integer NUC 1024 QAM only has 0.1 dB loss compared to non-integer NUC 1024 QAM with optimized constellation for MCS 10, while it has 0.2 dB loss compared to non-integer NUC 1024 QAM for MCS 11. The non-integer NUC 1024 QAM has about 1.3 dB gain over UC 1024 QAM at PER of 10% for MCS 10. The non-integer NUC 1024 QAM has about 1.6 dB gain over UC 1024 QAM at PER of 10% for MCS 11. In sum, the performance of the integer NUC 1024 QAM (i.e., NUC 1024 QAM with integer constellation points as shown in FIGS. 15 and 16) has small loss compared to that of the non-integer NUC 1024 QAM with optimized non-integer constellation points (as shown in FIGS. 17 and 18). The performance of the integer NUC 1024 QAM (i.e., NUC 1024 QAM with integer constellation points as shown in FIGS. 15 and 16) has 1-1.5 dB gain at PER of 10% compared to that of the UC 1024 QAM.

A few embodiments have been described in detail above, and various modifications are possible. The disclosed subject matter, including the functional operations described in this specification, can be implemented in electronic circuitry, computer hardware, firmware, software, or in combinations of these, such as the structural means disclosed in this specification and structural equivalents thereof, including, potentially, a program operable to cause one or more data processing apparatus to perform the operations described (such as a program encoded in a computer-readable medium, which can be a memory device, a storage device, a machine-readable storage substrate, or other physical, machine-readable medium, or a combination of one or more of these).

The term "data processing apparatus" encompasses all apparatus, devices, and machines for processing data, including by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of these.

A program (also known as a computer program, software, software application, script, or code) can be written in any form of programming language, including compiled or interpreted languages, or declarative or procedural languages, and can be deployed in any form, including as a standalone program or as a module, component, subroutine, or other unit suitable for use in a computing environment. A program does not necessarily need to correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites, and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations, and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
receiving, by a data processing apparatus, a bit pattern;
generating integer real and imaginary coordinates of M constellation points of a non-uniform constellation (NUC) M-quadrature amplitude modulation (M-QAM), wherein the respective integer and real imaginary coordinates of each of the M constellation points of the NUC M-QAM correspond to a scale factor multiplied with respective real and imaginary coordinates having respective decimal parts, wherein M is no less than 1024;
mapping, by the data processing apparatus, the bit pattern to the integer real and imaginary coordinates of one of the M constellation points according to a mapping rule of the NUC M-QAM; and
causing, by the data processing apparatus, a transmission signal to be modulated in accordance with the integer real and imaginary coordinates of the one of the M constellation points of the NUC M-QAM.

2. The method of claim 1, wherein M equals 1024.

3. The method of claim 2, wherein the respective integer real and imaginary coordinates of each of the M constellation points of the NUC M-QAM are from:
a first set of [1, 3, 5, 7, 9, 11, 13, 16, 18, 21, 23, 26, 29, 32, 36, and 40],
a second set of [1, 3, 5, 7, 9, 12, 14, 17, 19, 22, 24, 27, 30, 34, 37, and 40],
a third set of [1, 3, 5, 7, 9, 12, 15, 18, 21, 24, 27, 30, 33, 36, 39 and 42],
a fourth set of [1, 3, 5, 7, 9, 11, 13, 16, 18, 21, 23, 26, 28, 32, 36, and 40], or
a fifth set of [1, 3, 5, 7, 9, 11, 13, 15, 17, 20, 23, 26, 29, 32, 36, and 40].

4. The method of claim 2, wherein the integer respective real and imaginary coordinates of each of the M constellation points of the NUC M-QAM are determined based on integer parts of respective real and imaginary coordinates of a non-integer NUC M-QAM.

5. A device comprising:
a receiver; and
a processor configured by computer-readable instructions to cause the device to perform operations comprising:
generating integer real and imaginary coordinates of M constellation points of a non-uniform constellation (NUC) M-quadrature amplitude modulation (QAM), wherein M is no less than 1024 and the respective integer and real imaginary coordinates of each of the M constellation points of the NUC M-QAM correspond to a scale factor multiplied with respective real and imaginary coordinates having respective decimal parts;
receiving a data symbol carrying information of one of the M constellation points; and
determining, by a demodulator, the data symbol to be one of the M constellation points of the NUC M-QAM based on respective real and imaginary coordinates of the data symbol and the integer real and imaginary coordinates of the one of the M constellation points of the NUC M-QAM; and
mapping the one of M constellation points into a bit pattern according to a mapping rule of the NUC M-QAM.

6. The device of claim 5, wherein the data symbol is obtained from a received signal that is transmitted over a communication channel.

7. The device of claim 5, wherein determining, by the demodulator, the data symbol to be one of the M constellation points of the NUC M-QAM comprises determining, by the demodulator, a distance between the data symbol and the one of the M constellation points of the NUC M-QAM.

8. The device of claim 5, wherein determining the data symbol to be one of the M constellation points of the NUC M-QAM comprises determining, by the demodulator, a bitwise log-likelihood ratio (LLR) conditioned on the received data symbol.

9. The device of claim 5, wherein M equals 1024.

10. The device of claim 9, wherein the respective integer real and imaginary coordinates of each of the M constellation points of the NUC M-QAM are from:
a first set of [1, 3, 5, 7, 9, 11, 13, 16, 18, 21, 23, 26, 29, 32, 36, and 40],
a second set of [1, 3, 5, 7, 9, 12, 14, 17, 19, 22, 24, 27, 30, 34, 37, and 40],
a third set of [1, 3, 5, 7, 9, 12, 15, 18, 21, 24, 27, 30, 33, 36, 39 and 42],
a fourth set of [1, 3, 5, 7, 9, 11, 13, 16, 18, 21, 23, 26, 28, 32, 36, and 40], or
a fifth set of [1, 3, 5, 7, 9, 11, 13, 15, 17, 20, 23, 26, 29, 32, 36, and 40].

11. The device of claim 5, wherein the respective integer real and imaginary coordinates of each of the M constellation points of the NUC M-QAM are determined based on integer parts of respective real and imaginary coordinates of a non-integer NUC M-QAM.

12. A system comprising:
a transmitter coupled with a processor configured to generate integer real and imaginary coordinates of M constellation points of a non-uniform constellation (NUC) M-quadrature amplitude modulation (QAM), wherein M is no less than 1024 and the respective integer and real imaginary coordinates of each of the M constellation points of the NUC M-QAM correspond to a scale factor multiplied with respective real and imaginary coordinates having respective decimal parts, wherein M is no less than 1024, and further configured to cause the transmitter to:
receive a bit pattern;
map the bit pattern to the integer real and imaginary coordinates of one of the M constellation points according to a mapping rule of the NUC M-QAM; and
modulate a transmission signal in accordance with the integer real and imaginary coordinates of the one of the M constellation points of the NUC M-QAM.

13. The system of claim 12, further comprising a receiver coupled with a second processor configured to cause the receiver to:
receive a data symbol carrying information of a constellation point of the NUC M-QAM;
determine, by a demodulator, the data symbol to be one of M constellation points of the NUC M-QAM based on respective real and imaginary coordinates of the data symbol and integer real and imaginary coordinates of the one of the M constellation points of the NUC M-QAM; and
map the one of M constellation points into a bit pattern according to a mapping rule of the NUC M-QAM.

14. The system of claim 13, wherein the demodulator is configured to determine a bitwise log-likelihood ratio (LLR) conditioned on the received data symbol for iterative decoding of the received data symbol.

15. The system of claim 12, wherein M equals 1024.

16. The system of claim 15, wherein the integer respective real and imaginary coordinates of each of the M constellation points of the NUC M-QAM are from:
a first set of [1, 3, 5, 7, 9, 11, 13, 16, 18, 21, 23, 26, 29, 32, 36, and 40],
a second set of [1, 3, 5, 7, 9, 12, 14, 17, 19, 22, 24, 27, 30, 34, 37, and 40],
a third set of [1, 3, 5, 7, 9, 12, 15, 18, 21, 24, 27, 30, 33, 36, 39 and 42],
a fourth set of [1, 3, 5, 7, 9, 11, 13, 16, 18, 21, 23, 26, 28, 32, 36, and 40], or
a fifth set of [1, 3, 5, 7, 9, 11, 13, 15, 17, 20, 23, 26, 29, 32, 36, and 40].

17. The system of claim 12, wherein the integer respective real and imaginary coordinates of each of the M constellation points of the NUC M-QAM are determined based on integer parts of respective real and imaginary coordinates of a non-integer NUC M-QAM.

* * * * *